US009179734B2

(12) United States Patent
Zsolcsak et al.

(10) Patent No.: US 9,179,734 B2
(45) Date of Patent: *Nov. 10, 2015

(54) HEATED INSOLE WITH REMOVABLE AND RECHARGEABLE BATTERY

(71) Applicant: Schawbel Technologies LLC, Bedford, MA (US)

(72) Inventors: Veronica M. Zsolcsak, Newburyport, MA (US); Micha Eizen, Lake Forest, CA (US); Thomas John William Bayes, Rothwell (GB); Ian Nicholson Whitehead, Concord, MA (US)

(73) Assignee: Schawbel Technologies LLC, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/511,528

(22) Filed: Oct. 10, 2014

(65) Prior Publication Data

US 2015/0150337 A1    Jun. 4, 2015

Related U.S. Application Data

(63) Continuation of application No. 14/248,861, filed on Apr. 9, 2014, now Pat. No. 8,869,428.

(60) Provisional application No. 61/947,913, filed on Mar. 4, 2014, provisional application No. 61/911,835, filed on Dec. 4, 2013.

(51) Int. Cl.
*A43B 7/02*    (2006.01)
*A43B 7/04*    (2006.01)
(Continued)

(52) U.S. Cl.
CPC ............ *A43B 7/025* (2013.01); *A43B 3/0015* (2013.01); *A43B 7/04* (2013.01); *A43B 7/34* (2013.01); *A43B 13/38* (2013.01); *A43B 17/00* (2013.01)

(58) Field of Classification Search
CPC ...... A43B 7/04; A43B 3/0015; A43B 3/0005; A43B 7/02; A43B 7/025; H05B 3/342
USPC ..................... 36/2.6, 137, 139, 132
See application file for complete search history.

(56) References Cited

U.S. PATENT DOCUMENTS 2,680,918 A    6/1952    Behner
3,360,633 A *  12/1967   Weisberger .................. 219/211
(Continued)

FOREIGN PATENT DOCUMENTS

CN    2281677    5/1998
CN    2515992 Y  10/2002
(Continued)

OTHER PUBLICATIONS

International Search Report and Written Opinion mailed on Sep. 3, 2014, for International Patent Application No. PCT/US2014/033499, filed Apr. 9, 2014, (10 pages).

(Continued)

*Primary Examiner* — Ted Kavanaugh
(74) *Attorney, Agent, or Firm* — Brown Rudnick LLP

(57) ABSTRACT

A heated insole for a shoe has an insole body and a battery. The insole body has a battery-receiving portion. The battery is configured to be removable from and insertable into the battery-receiving portion while the insole is disposed within the shoe.

28 Claims, 17 Drawing Sheets

(51) Int. Cl.
  *A43B 3/00* (2006.01)
  *A43B 17/00* (2006.01)
  *A43B 7/34* (2006.01)
  *A43B 13/38* (2006.01)

(56) References Cited

U.S. PATENT DOCUMENTS

| | | | |
|---|---|---|---|
| 3,585,736 A | 6/1971 | Polichena | |
| 3,800,133 A * | 3/1974 | Duval | 362/103 |
| 4,507,877 A | 4/1985 | Vaccari et al. | |
| 4,665,301 A | 5/1987 | Bondy | |
| 4,823,482 A | 4/1989 | Lakic | |
| D303,524 S | 9/1989 | Siegner et al. | |
| 4,894,931 A | 1/1990 | Senee et al. | |
| 4,910,881 A | 3/1990 | Baggio et al. | |
| 5,041,717 A | 8/1991 | Shay, III et al. | |
| D320,212 S | 9/1991 | Someya | |
| 5,230,170 A | 7/1993 | Dahle | |
| 5,483,759 A | 1/1996 | Silverman | |
| 5,495,682 A | 3/1996 | Chen | |
| 5,592,759 A | 1/1997 | Cox | |
| 5,623,772 A | 4/1997 | Sunderland et al. | |
| 5,875,571 A | 3/1999 | Huang | |
| 5,882,106 A | 3/1999 | Galli | |
| 5,956,866 A | 9/1999 | Spears | |
| 6,094,844 A | 8/2000 | Potts | |
| D432,493 S | 10/2000 | Killebrew et al. | |
| D440,201 S | 4/2001 | Huynh et al. | |
| 6,320,161 B1 | 11/2001 | Hansen, Jr. | |
| 6,523,836 B1 | 2/2003 | Chang et al. | |
| 6,657,164 B1 | 12/2003 | Koch | |
| D486,789 S | 2/2004 | Santiago | |
| 6,701,639 B2 | 3/2004 | Treptow et al. | |
| 6,770,848 B2 | 8/2004 | Haas et al. | |
| 6,840,955 B2 | 1/2005 | Ein | |
| 6,841,757 B2 | 1/2005 | Marega et al. | |
| 6,865,825 B2 | 3/2005 | Bailey, Sr. et al. | |
| D528,075 S | 9/2006 | Sugeno et al. | |
| D533,832 S | 12/2006 | Hock | |
| D538,225 S | 3/2007 | Lyman et al. | |
| D538,226 S | 3/2007 | Lyman et al. | |
| D546,277 S | 7/2007 | Andre et al. | |
| D552,081 S | 10/2007 | Yano | |
| 7,497,037 B2 | 3/2009 | Vick et al. | |
| D602,432 S | 10/2009 | Moussa | |
| D609,180 S | 2/2010 | Suzuki et al. | |
| 7,714,709 B1 * | 5/2010 | Daniel | 340/539.11 |
| 7,716,856 B2 | 5/2010 | Seipel | |
| 7,726,046 B2 | 6/2010 | Portnell | |
| 7,823,302 B2 | 11/2010 | Mann et al. | |
| D637,552 S | 5/2011 | Inman et al. | |
| 7,985,502 B2 | 7/2011 | Abe et al. | |
| D642,517 S | 8/2011 | Inman et al. | |
| 8,074,373 B2 | 12/2011 | Macher et al. | |
| 8,084,722 B2 | 12/2011 | Haas et al. | |
| D654,429 S | 2/2012 | Li et al. | |
| D660,798 S | 5/2012 | Tseng | |
| D682,195 S | 5/2013 | Aglassinger | |
| D685,729 S | 7/2013 | Lyman | |
| D686,157 S | 7/2013 | Kawase et al. | |
| 8,510,969 B2 | 8/2013 | Luo | |
| D689,019 S | 9/2013 | Sato et al. | |
| D694,176 S | 11/2013 | Buetow et al. | |
| D698,313 S | 1/2014 | Buetow et al. | |
| D699,178 S | 2/2014 | Ashida et al. | |
| D699,179 S | 2/2014 | Alexander | |
| D700,135 S | 2/2014 | Sato et al. | |
| 8,715,329 B2 | 5/2014 | Robinson et al. | |
| 8,850,716 B2 | 10/2014 | Whitehead et al. | |
| 8,869,428 B1 * | 10/2014 | Zsolcsak et al. | 36/2.6 |
| 8,869,429 B1 * | 10/2014 | Zsolcsak et al. | 36/2.6 |
| 2003/0114902 A1 | 6/2003 | Prescott | |
| 2003/0145494 A1 | 8/2003 | Hsu | |
| 2005/0126049 A1 * | 6/2005 | Koenig | 36/141 |
| 2006/0174521 A1 | 8/2006 | Lee | |
| 2006/0230641 A1 | 10/2006 | Vick et al. | |
| 2006/0283050 A1 * | 12/2006 | Carnes et al. | 36/132 |
| 2007/0039201 A1 | 2/2007 | Axinte | |
| 2008/0016715 A1 | 1/2008 | Vickroy | |
| 2008/0069524 A1 | 3/2008 | Yamauchi et al. | |
| 2008/0083720 A1 | 4/2008 | Gentile et al. | |
| 2008/0197126 A1 | 8/2008 | Bourke et al. | |
| 2009/0013554 A1 | 1/2009 | Macher et al. | |
| 2010/0192406 A1 | 8/2010 | Au | |
| 2011/0083339 A1 | 4/2011 | Luo | |
| 2011/0107771 A1 | 5/2011 | Crist et al. | |
| 2011/0296714 A1 * | 12/2011 | Holzer | 36/132 |
| 2011/0306299 A1 | 12/2011 | Wells | |
| 2013/0174451 A1 * | 7/2013 | Kremer et al. | 36/136 |
| 2013/0181662 A1 | 7/2013 | Shapiro | |
| 2013/0213147 A1 * | 8/2013 | Rice et al. | 73/862.046 |
| 2013/0244074 A1 | 9/2013 | Kremer et al. | |
| 2014/0059894 A1 | 3/2014 | Lupinek et al. | |
| 2014/0182163 A1 | 7/2014 | Krupenkin et al. | |
| 2014/0222173 A1 * | 8/2014 | Giedwoyn et al. | 700/91 |
| 2014/0277632 A1 * | 9/2014 | Walker | 700/91 |

FOREIGN PATENT DOCUMENTS

| | | |
|---|---|---|
| CN | 201976877 U | 9/2011 |
| DE | 20317143 U1 | 4/2004 |
| DE | 10352050 A1 | 12/2004 |
| DE | 102008029727 A1 | 12/2009 |
| EP | 2215918 A2 | 8/2010 |
| KR | 20-0273770 | 4/2002 |
| WO | 2006/111823 A1 | 10/2006 |
| WO | 2008/006731 A1 | 1/2008 |
| WO | 2008/069254 A1 | 6/2008 |
| WO | 2008/069524 A1 | 6/2008 |
| WO | 2013/101920 A1 | 7/2013 |

OTHER PUBLICATIONS

International Search Report and Written Opinion for International application No. PCT/US12/23986 filed Feb. 2, 2012 and mailed on May 23, 2012, (7 pages).

International Search Report and Written Opinion mailed on Apr. 22, 2013, for International Patent Application No. PCT/US2012/071797, filed Dec. 27, 2012, (9 pages).

Kenisarin et al., 2007, Solar energy storage using phase change materials, Renewable and Sustainable Energy Reviews, 11(9):1913-1965.

Sharma et al., 2009, Review on thermal energy storage with phase change materials and applications, Renewable and Sustainable Energy Reviews, 13(2):318-345.

* cited by examiner

HEATED INSOLE WITH REMOVABLE AND RECHARGEABLE BATTERY

RELATED APPLICATIONS

This application is a continuation of U.S. Non-Provisional application Ser. No. 14/248,861, filed Apr. 9, 2014, which claims the benefit of and priority to U.S. Provisional Application Nos. 61/947,913, filed Mar. 4, 2014, and 61/911,835, filed Dec. 4, 2013. Each of the foregoing applications is incorporated by reference herein.

TECHNICAL FIELD

This application relates to insoles such as heated insoles that include a battery.

BACKGROUND

Several occupations require employees to endure harsh weather conditions during the winter months. To name a few, soldiers, construction workers, agricultural workers, and law enforcement officers must routinely spend several hours outdoors despite cold, snowy or icy conditions. Others happily brave cold weather in order to enjoy activities such as skiing, hiking, snowshoeing, and sledding. Further, many must bear freezing temperatures after a snowstorm to shovel their car out and to clear accumulated snow from their driveway and/or sidewalk.

Regardless of whether one is exposed to cold weather conditions for work, fun, or chores, most accessorize with coats, boots, hats, and gloves to make the cold weather bearable. In addition to those accessories, heated insoles for shoes have recently been introduced in order to provide heat directly to a wearer's feet. Known heated insoles include electronics located between an insole's layers. The heated insoles include an internal heating pad coupled to an internal battery. The internal battery, due its size, has a limited battery life (e.g., 3-4 hours). In order to charge the electronics, one must connect the heated insole to an electrical power source. This requirement is a hassle for those who desire warmth in excess of the battery life. One must remove the heated insole from the shoe, plug in the insole to recharge its internal battery, wait for the insole's internal battery to recharge, and then re-introduce the insole into the shoe prior to continuing with their activity.

SUMMARY

A battery-powered insole, according to the invention, allows a user to easily remove and replace a battery without having to remove the insole from the shoe, and the user does not have to wait for the insole to recharge.

According to certain aspects, an insole of the invention includes an insole body having a battery-receiving portion and a battery. The battery-receiving portion is configured such that the battery is removable from and insertable into the insole body while the insole is disposed within a shoe. In certain embodiments, the battery-receiving portion of the insole is a frame. The frame may be part of a heating assembly that provides heat to a wearer's foot when powered by the battery. The heating assembly is typically located within the insole and delivers heat to at least the forefoot portion of the shoe. The heating assembly may include a heating member and a connector, in addition to the frame. The connector of the heating assembly may be operably coupled to the frame, and functions to transfer energy from the battery to the heating member. The heating member may include a heater panel and a conductive ribbon that transfers energy along a length of the insole to the heater panel. The heating assembly may further include a circuit coupled to the connector. The circuit allows one to adjust the level of energy being transferred from the battery to the heating member. In certain embodiments, the circuit is adjustable from a remote control.

A benefit of the present invention is that the battery may be easily inserted into and removed from the insole. The removable and insertable battery is preferably designed to mate-fit with the frame of the insole. In certain embodiments, the battery is configured to fit within the frame while being directly removable from a surface of the insole. Ideally, a surface of the battery, when the battery is disposed within the frame, is substantially flush with a surface of the frame and/or insole. This prevents the removable battery from being disruptive or uncomfortable to a user wearing the insole. The battery formed as part of a battery pack, which includes a body that encloses a battery cell. In addition, the battery may be rechargeable.

As discussed above, the frame may include a connector that provides energy transfer from the battery to the heating member. Preferably, the connector is configured to pivot to accommodate movement of the battery into and out of the frame. The pivoting movement advantageously allows the battery to mate-fit within the frame while also allowing one to insert the battery into and remove the battery from the insole while the insole is disposed within a shoe.

The insole of the invention may be an independent item that is separate from a shoe that the insole is being used with. In such case, the insole is insertable and removable from the shoe. Alternatively, the insole of the invention can be built within or incorporated into the shoe itself (i.e. not designed for easy removal). Thus, the invention also includes a shoe having an insole that is configured to receive a removable battery such that the battery may be inserted into and removed from the insole with the insole disposed within the shoe.

Some aspects of the invention include a battery with a cushion portion that is substantially flush with a surface of the insole. In addition, the battery, when disposed within the insole, may be removable from the insole without removing the insole from the shoe. In certain embodiments, the battery is directly removable from a surface of the insole. The battery may include a connector portion that mates with a connector of the insole in order to provide energy transfer. The battery may be a battery pack, which includes a body that encloses a battery cell. The battery may include a base portion that mates within a frame of the insole. The cushion portion (such as a foam cushion) may be coupled to the base portion. When the battery is installed in the insole, the cushion portion forms a surface of the insole, and provides comfort to a user wearing a shoe with the insole disposed therein. In addition, the battery may be rechargeable.

Aspects of the invention further include assemblies for inclusion in insoles. An assembly for inclusion in an insole may include a heating member and a frame with a connector. The assembly may be incorporated into an insole to form a heated insole. The assembly is for use in conjunction with a battery. The frame is designed to receive the battery, which couples to the connector. In certain embodiments, the connector pivots to connect and decouple from the battery. The connector places the battery in electrical communication with the heating member for energy transfer. The heating member may include a heater panel coupled to a conductive ribbon. A circuit may be included to adjust a level of energy transmitted from the battery to the heating member. The circuit may be operated by a remote control. In certain embodiments, the assembly, when included in an insole, is configured to provide direct removal of the battery from a surface of the insole. In addition, the assembly, when included in an insole, preferably allows one to remove the battery from the insole when it is disposed within a shoe. The above-described assembly can also be incorporated directly into a sole of a shoe.

DETAILED DESCRIPTION

While the invention is described herein as pertaining to heated insoles, concepts of the present invention are also applicable to other insoles that may require battery power. For example, the structure and configuration of the present insoles with removable and insertable batteries can be applied in insoles having a vibrating mechanism (e.g. massaging insoles). In addition, the invention is described in reference to one insole and shows a left-footed insole, but it is understood that the invention could be used to form right-footed insoles or a pair of insoles (right-footed and left-footed insoles)

Figure 1A:
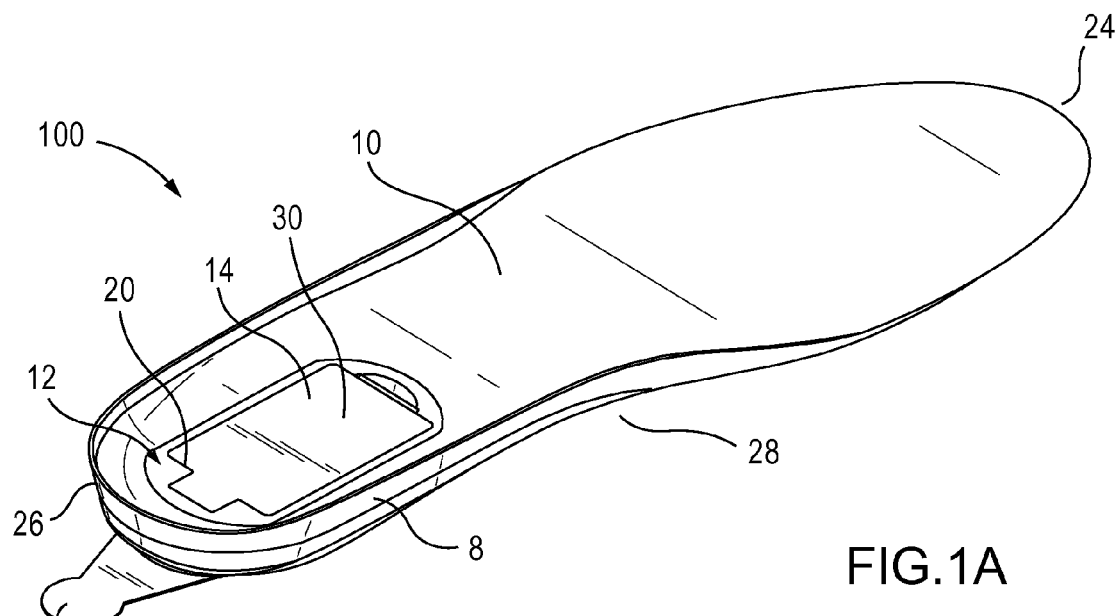
FIG. 1A illustrates a perspective view of an insole of the invention.
Figure 1B:
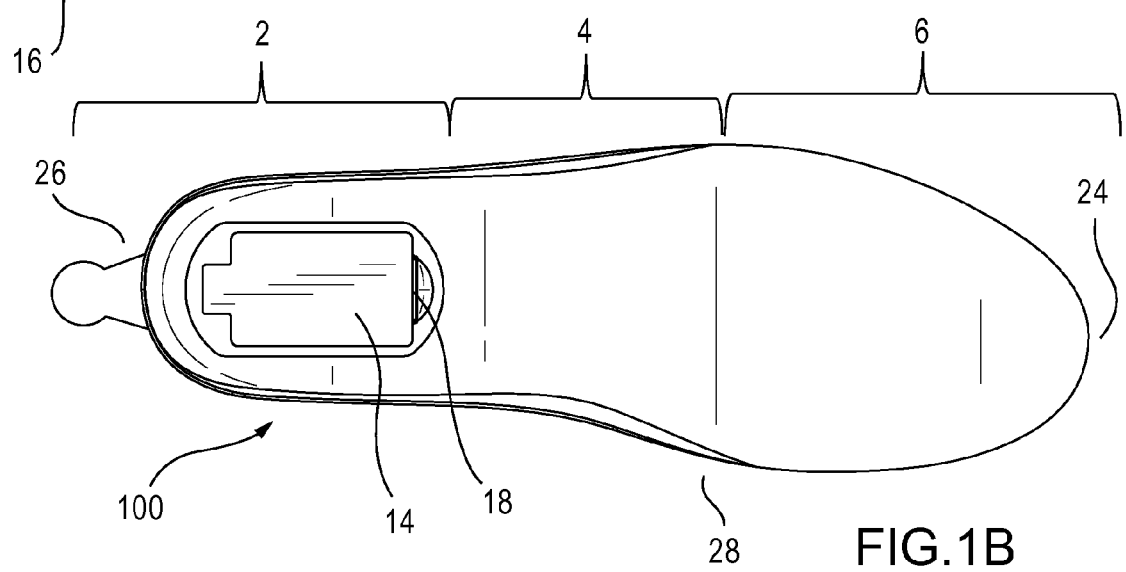
FIG. 1B illustrates a top view of the insole of FIG. 1A.
Figure 1C:
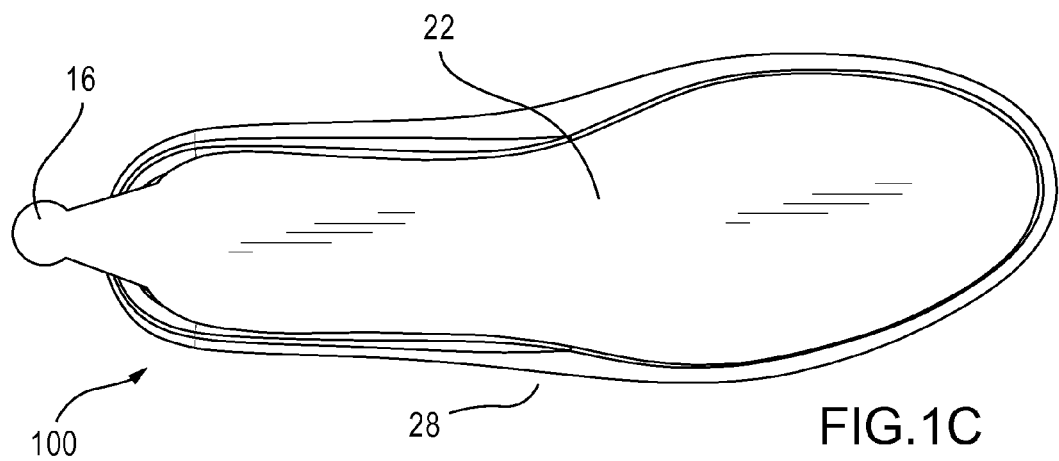
FIG. 1C illustrates a bottom view of the insole of FIG. 1A.

FIGS. 1A-1C illustrate views of an exemplary insole 100 according to the invention. As shown in FIGS. 1A-1C, the insole 100 includes a body 28 that has a distal end 24 and a proximal end 26, and can be divided up into separate sections: a heel portion 2, a midfoot portion 4, and a forefoot portion 6. The heel portion 2 is typically thicker than the midfoot portion and forefoot portion 6 due to additional cushioning. The midfoot portion 4 may be designed to support the arch of one's foot and provides a transition between the heel portion 2 and the forefoot portion 6. The forefoot portion 6 corresponds to the ball of one's foot and toes. Preferably, the insole body 28 is shaped to conform to a foot (left or right) of a user. In addition, the insole body 28 may be shaped to fit within any type of shoes, including boots, tennis shoes, ski boots, sandals, slip-ons, etc. Ideally, the insole body 28 is flexible such that it flexes with the motion of one's foot while they walk.

The insole body 28 includes a top surface 10, a bottom surface 22, a side surface 8. The top surface 10 receives the foot of a wearer, and the bottom surface 22 rests against the sole (bottom frame) of the shoe. The top surface 10 or bottom surface 22 may be specially formed to conform to different types of feet and different types of shoes. In addition, the bottom surface 22 may rest or be designed to rest against another insole (i.e. for when the shoe has built-in insoles). The insole body 10 may be formed, at least in part, by a cushioned material to provide comfort to the user. Furthermore, the insole body 28 may be formed as part of the sole of a shoe. For instance, when the shoe, due to its structure, does not have an insole separate from the sole itself, which is often the case in slip-on shoes.

The insole body 28 of the insole 100 includes a frame 12 that is configured to receive a battery 14 disposed therein. Preferably, the frame 12 is positioned in the heel portion 2 of the insole 100, or in the arch segment of the insole 100. The top surface 20 of the frame is substantially flush or flush with a top surface 10 of the insole body 28. As shown in FIGS. 1A and 1B, the battery 14 is shown inserted in the frame 20. The top surface 30 of the battery 14 is substantially flush or flush with the top surfaces 10, 20 of the insole body 28 and frame 12, respectively. This flushness advantageously allows a user to comfortably rest his/her foot against the insole 100 without feeling differences among the multiple components. In addition, top surfaces 20, 30 of the frame 12 and battery 14 may be cushioned in the same manner as the insole body 28 to further prevent a wearer from feeling or being disrupted by the multiple components. For example, each component may be formed from a polymer or polymer foam. A preferred polymer or polymer foam is polyurethane. Alternatively, the components may be formed from different materials.

The frame 12 optionally includes a grasping region 18 that is shaped to allow a user to directly remove the battery 14 from the top surface 10 of the insole body 28. That is, one does not have to remove the battery 14 from an enclosed battery compartment (i.e. with a lid for example), but can access the battery from the outer surface of the insole. As shown, the grasping region 18 is a recess within the frame 12 next to the battery 14. Preferably, the grasping region 18 is shaped to allow a wearer to partially insert one or more fingertips therein so that the wearer can use their fingertips to easily remove the battery 14. The grasping region 18 may be positioned anywhere within the frame 12, and is shown on a distal portion of the frame 12.

According to certain aspects, insoles 100 of the invention may be inserted and removed into one's shoes when one desires. In such aspect, the insole is a separate from the shoe. For removable insoles, the insole 100 may include a tab 16 that a user can pull to remove the insole 100 from the inside of a shoe. Alternatively, insoles 100 of the invention may be built into one's shoes (e.g. not designed for easy removal).

Figure 2A:
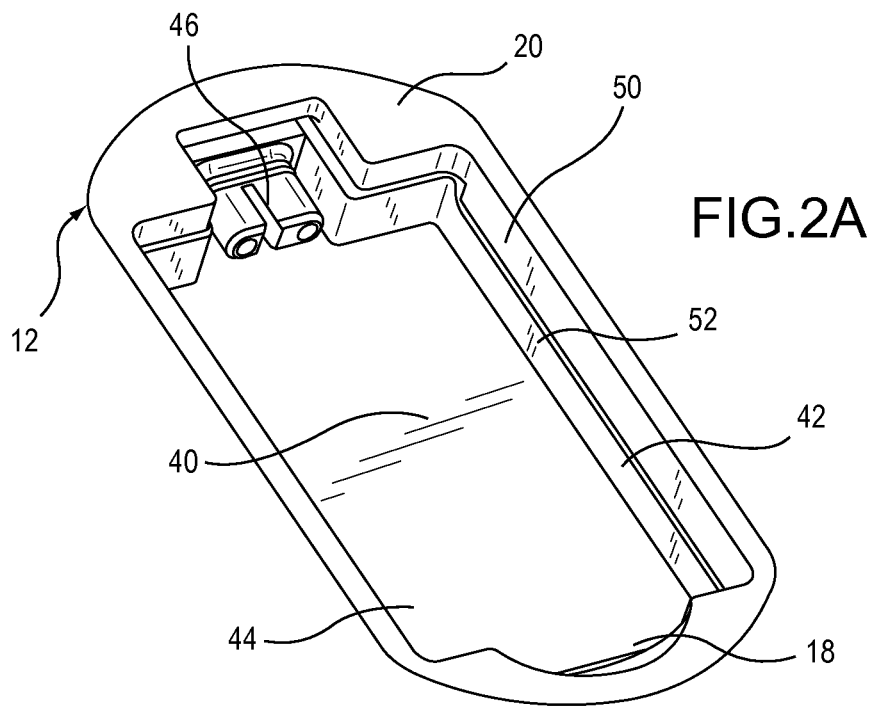
FIG. 2A illustrates a perspective view of a frame of an insole of the invention.
Figure 2B:
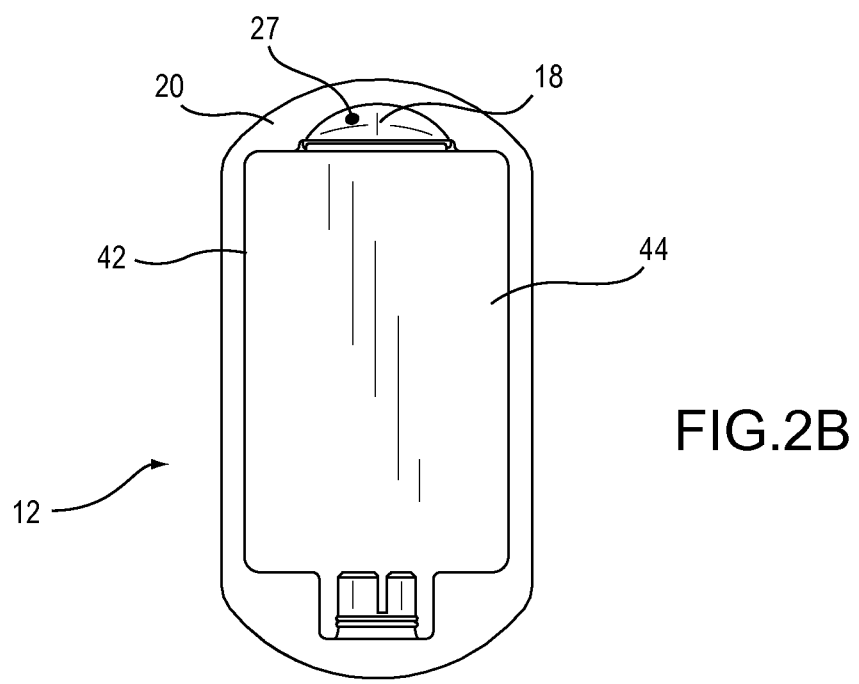
FIG. 2B illustrates a top view of a frame of the insole of FIG. 2A.

FIGS. 2A and 2B provide a close-up view of the frame 12 without a battery inserted therein. The frame 12 defines a recess 40 that is surrounding by sides 42 and bottom 44. The recess 40 of the frame 14 is sized and shaped to receive the battery 14. Preferably, the frame 12 snuggly receives the battery 14 within the recess 40 to prevent unintended movement or removal of battery 14. The frame 12 further includes a connector 46. The connector 46 couples to the battery 14, and places the battery 14 in communication with a heating member (discussed hereinafter). In certain embodiments, the coupling between the connector 46 and the battery 14 is a mate-fit coupling (the particulars of which are described in more detail hereinafter). The connector 46 is preferably constructed out of an elastomeric material, which provides the ability to absorb deflection and stress. The connector 46 may pivot to assist in battery 14 insertion and removal (this function is described in more detail hereinafter). The pivoting capability and flexibility of the connector 46 allow it to maintain its mechanical integrity even when deflecting while bearing weight and other stresses.

In certain embodiments and as shown in FIG. 2A, the frame 12 may include a rigid portion 52 and a cushion portion 50. The cushion portion 50 provides comfort to the user, and the rigid portion 52 provides the needed structural support for the connector 46 and associated circuitry. The cushion portion 50 may be a polymeric foam.

In certain embodiments, the frame 12 of the insole 100 includes a battery indicator. The battery indicator may include light emitting diode (LED) that is associated with circuitry (such as circuit 210 shown in FIGS. 5 and 6) disposed within the insole. In one embodiment, the battery indicator emits a light when the battery 14 is inserted into the insole 100. The emitted light my indicate that the battery 14 is fully connected and may appear as a single flash, a series of flashes over time, or the light may constantly be emitted while the battery is in place. Optionally, the battery indicator also emits a light to illustrate that the battery 14 is running low on charge. The low-battery light may appear as a single flash, a series of flashes over time, or constantly emitted light. Preferably, the light emitted to indicate that the battery is properly inserted or connected is different from the light emitted to indicate the battery is low on charge. For example, a green light may indicate the battery is properly inserted, and a red light may indicate the battery needs to be recharged. In addition, the battery indicator may also emit a light to illustrate that the battery 14 is defective, and should be discarded.

The battery indicator may be positioned anywhere on the insole 100. According to some embodiments, the battery indicator is positioned on the frame so that it is easily visible to a user while the insole is disposed within a shoe. FIG. 2B shows a battery indicator 27 positioned in the grasping region 18 of the frame 12. In this particular embodiment, the battery indicator 27 includes an LED in close proximity with an opening of the grasping region 18 of the frame 12. The frame 12 near the battery indicator 27 may include a reflective surface to further enhance the light emitted from the LED. The opening allows light emitted from an LED, which is associated with the internal circuitry of the insole, to be seen therethrough.

The battery 14 may be the battery itself (i.e. one or more battery cells) or a battery pack, which is a body that encloses one or more battery cells. Any suitable battery may be used for the battery or battery cell. Types of batteries include, for example, nickel cadmium, nickel-metal hydride, lead acid, lithium ion, lithium ion polymer batteries. The battery chosen ideally holds charge for more than 2, 3, 4 or 5 hours, and is rechargeable. In one aspect, the battery 14 is a battery pack, and such aspect is described hereinafter and shown in FIGS. 3A-3C. The battery can be inserted and removed from the insole (or sole) at the user's convenience.

FIGS. 3A-3D illustrate battery 14 as a battery pack according to certain embodiments. Preferably, the battery 14 is shaped to fit within the frame 12 such that the top surface of the battery 14 is substantially flush or flush with top surfaces of the frame 12 and insole body 28. In some embodiments, the battery 14 includes a lower body portion 62 and an upper body portion 64. The lower body portion 62 may be formed from a polymeric material, and the upper body portion 64 may be a polymeric form. The lower body portion 62 is designed to mate fit with the rigid portion 52 of the insole frame 12. The lower body portion 62 also includes a connector portion 66 that is designed to couple (i.e. mate-fit) to the connector 46 of the frame 12. In certain embodiments, the lower body portion 62 is also rigid to protect the battery cell disposed therein and to protect the coupling between the battery connector 66 and the frame connector 46. The lower body portion 62 may include a door or latch that allows one to remove the battery cell(s) disposed therein. The upper body portion 64 is coupled to the lower body portion 62. Preferably, the upper body portion 64 is cushioned to provide comfort to a user.

Figure 3A:
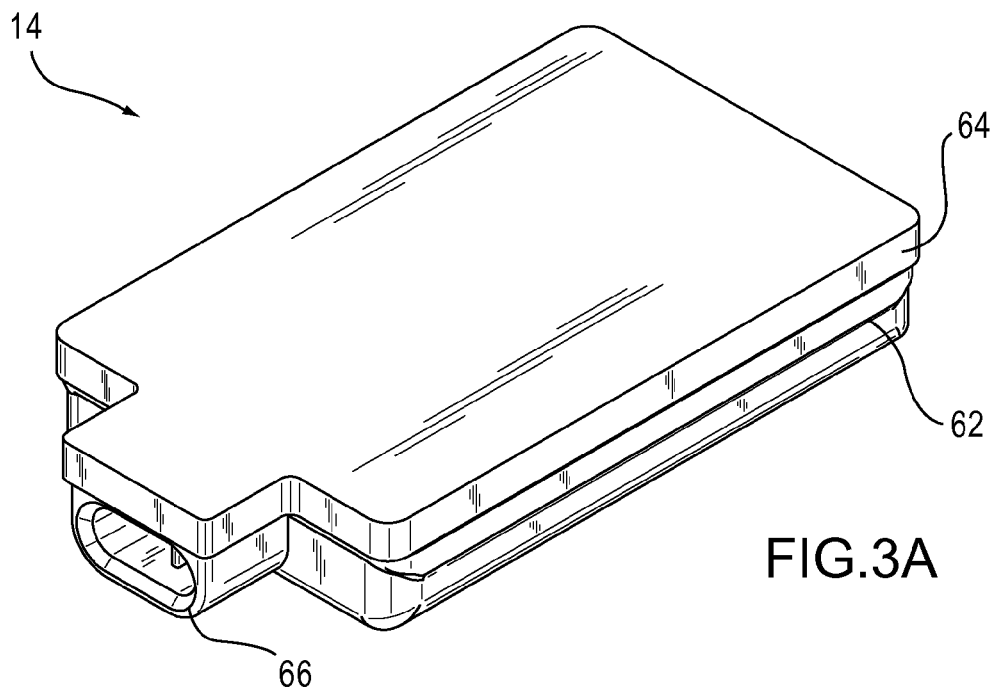
FIG. 3A illustrates a perspective view of a battery of the invention.
Figure 3B:
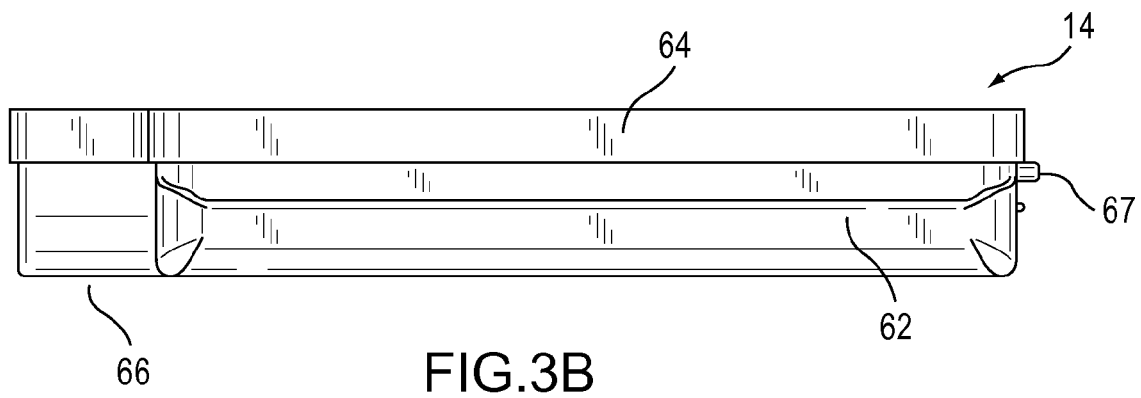
FIG. 3B illustrates a side view of the battery of FIG. 3A.

According to certain embodiments, the battery 14 includes a finger tab 67 that one can leverage with his/her finger to assist in removing the battery 14 from the frame 12. The finger tab 67 can extend from the lower body portion 62, and may be positioned on any side of the battery 14. Preferably, the finger tab 67 is on a side of the battery 14 that mates with the grasping region 18 of the frame 12. As shown in FIG. 3B, the finger tab 67 is positioned at the distal end of the lower body portion 62, which is opposite to the connector 66, and is level with the top of the lower body portion 62.

Figure 3C:
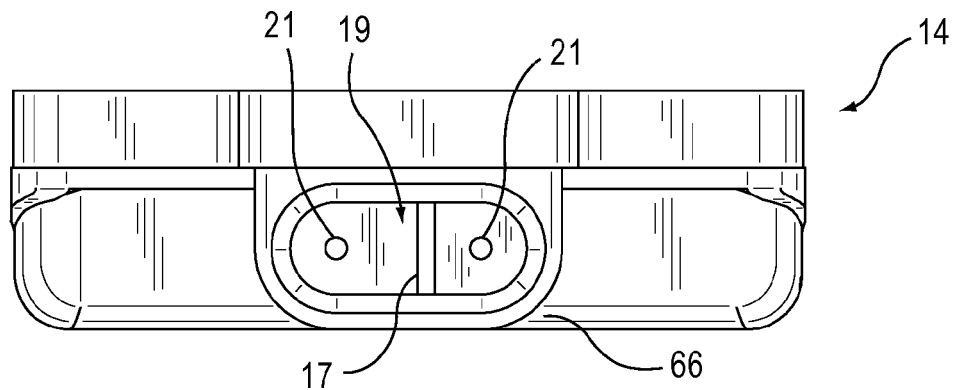
FIG. 3C illustrates a front view of the battery of FIG. 3A.
Figure 3D:
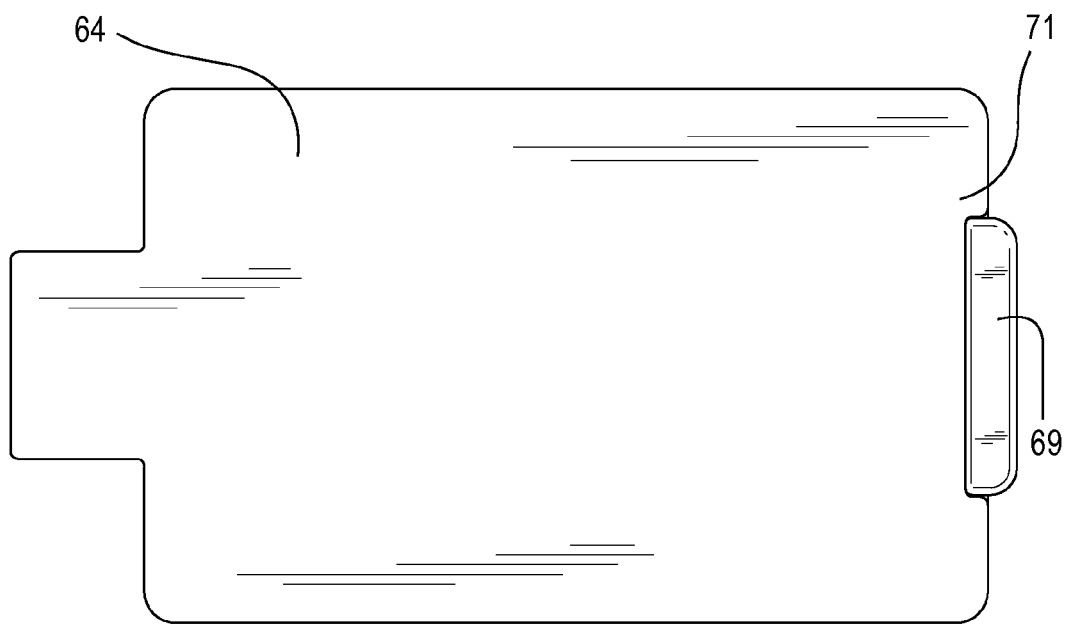
FIG. 3D illustrates a top view of a battery of the invention, according to another embodiment.
Figure 3E:
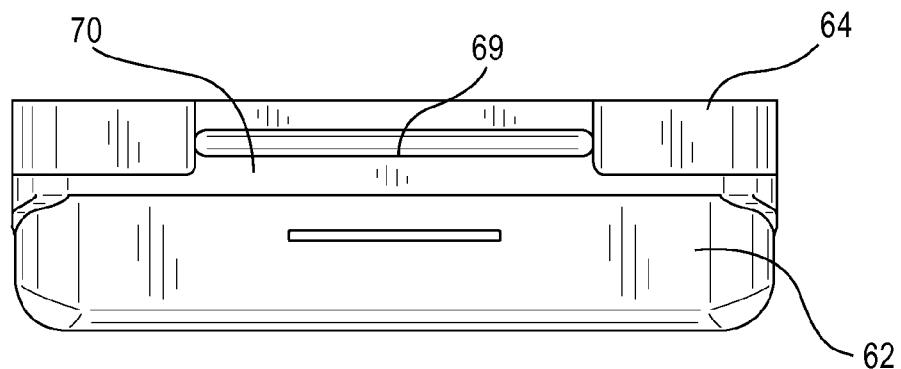
FIG. 3E illustrates a rear view of the battery of FIG. 3D.
Figure 3F:
FIG. 3F illustrates a side view of the battery of FIG. 3D.

In preferred embodiments, the lower body portion 62 and the upper body portion 64 are designed to accommodate a raised finger tab 69, as shown in FIGS. 3D-3E. In such embodiment, one side (such as the distal end) of the lower body portion 62 may include a raised portion 70 from which the raised finger tab 69 extends. In addition, one side (such as the distal end) of the upper body portion 64 may include a cut-out 71 to accommodate the raised portion 70. The raised finger tab 69 further eases one's ability to remove the battery 14 with his/her fingertip.

Figure 4A:
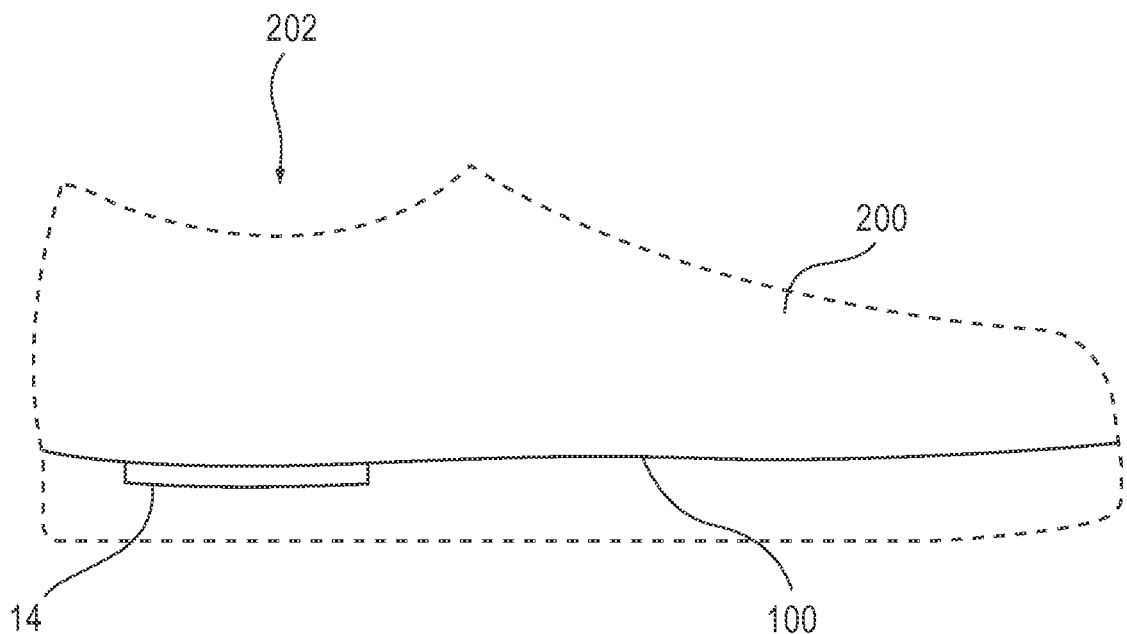
FIGS. 4A and 4B illustrate an insole of the invention disposed within a shoe.
Figure 4B:
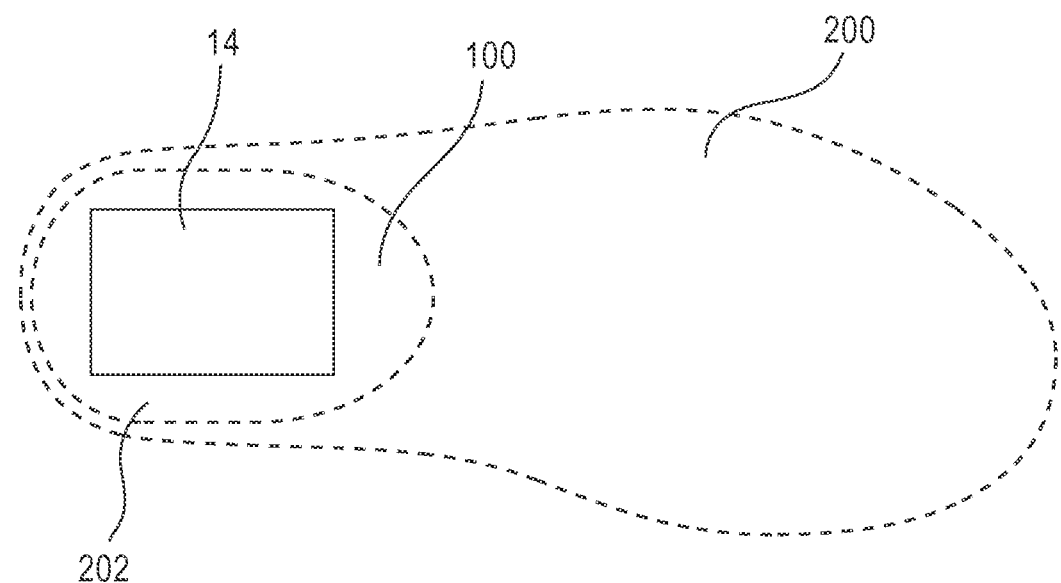

A benefit of insoles of the invention is that the battery 14 may be removed from the insole 100 while the insole is disposed within a shoe. FIGS. 4A and 4B graphically illustrate an insole 100 of an invention disposed within a shoe 200. The insole 100 is placed within a shoe 200 such that the bottom surface of the insole rests against, for example, a sole of the shoe 200. The battery 14 of the insole 100 is positioned at the heel portion of the insole such that the battery 14 is accessible from the shoe opening 202. The battery 14 may be conveniently inserted into and removed from the shoe 200, while the insole 100 is disposed within the shoe, by simply reaching one's hand into the shoe opening 202 and grabbing the battery 14. This allows one to quickly replace a used battery for a charged battery, without having to remove the insole or wait for an internal battery of the insole to charge. In addition, the used battery may be recharged while the charged battery is being used. For example, the used battery may be charged in the charging magazine shown in FIG. 17.

Figure 5:
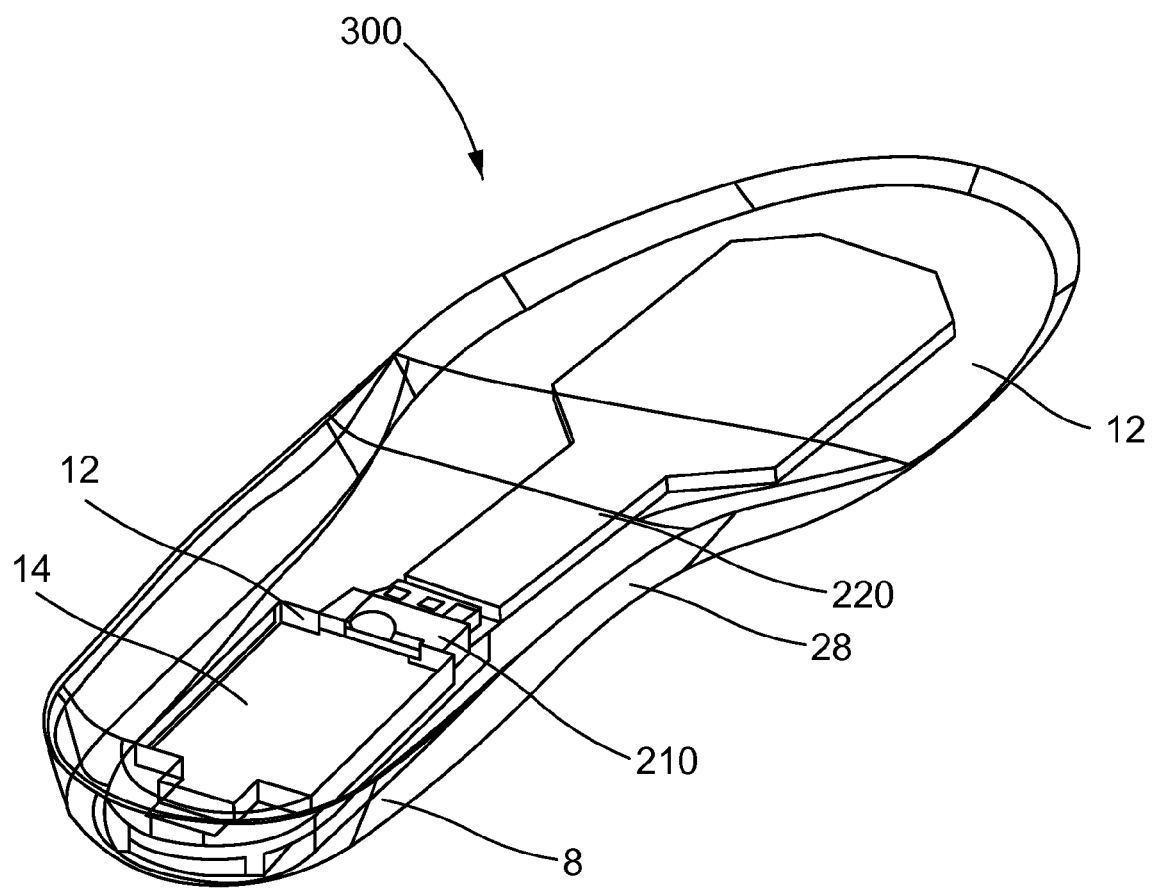
FIG. 5 provides a partially transparent view of a heated insole 300 according to certain embodiments.

As discussed above, insoles of the invention with removable batteries are particularly well-suited for use as heated insoles. FIG. 5 provides a partially transparent view of a heated insole 300 according to certain embodiments. The heated insole 300 (like insole 100) includes an insole body 28, a frame 12 disposed in the heel portion of the insole, and a battery 14 placed within the frame 12. The surfaces of the battery 14, frame 12, and insole body 28 may be substantially flush with each other. The battery 14 may be removed directly from the surface of the insole body 28. In addition, the battery 14 may be removed from the insole 300 while the insole 300 is disposed within a shoe. The heated insole 300 further includes a heating assembly 220, which is described in more detail hereinafter. The heating assembly 220 is coupled to the battery 14 via the connector 46 (not shown in FIG. 5) of the frame 12. Optionally, the heating assembly 220 includes a circuit 210. The heating assembly 220 extends from the heel portion to the forefoot portion of the insole body 28. The heating assembly 220, when powered by the battery 14, provides heat to a wearer of shoe having the insole 300 disposed therein. In addition, the heating assembly 220 may be flexible such that it flexes in response to a wearer's movement.

Figure 6:
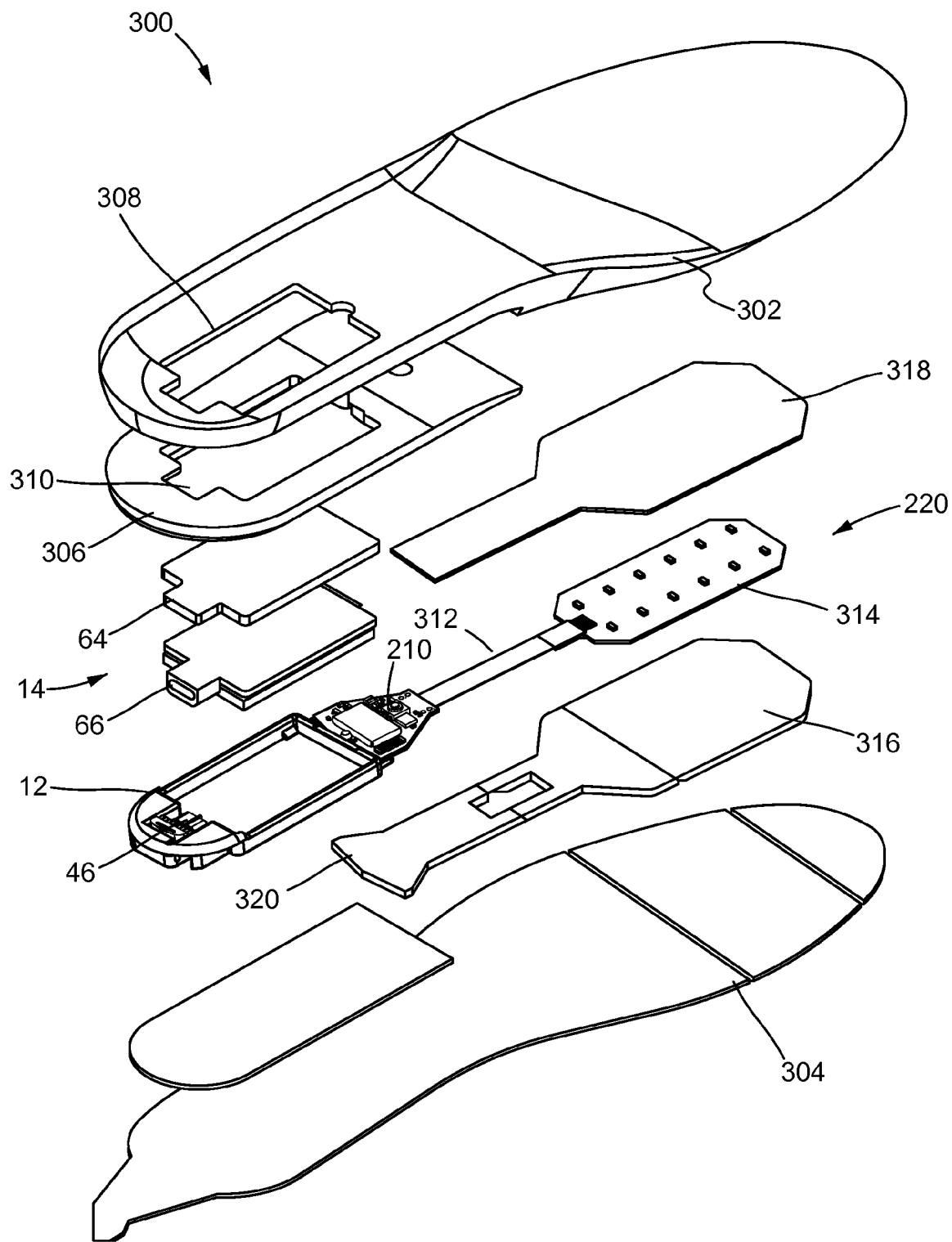
FIG. 6 illustrates an exploded view of a heated insole according to certain embodiments.

FIG. 6 illustrates an exploded view of the components of the heated insole 300. The main components of the insole body 28 include a top layer 302, a heel cushion 306, and a bottom layer 304. The top layer 302 and the heel cushion 306 include openings 308, 310 (respectively). The openings 308, 310 are designed to receive the frame 12. The frame 12 is designed to receive the battery 14. The battery 14 includes a lower body portion 62 (e.g. a rigid body that encases a battery cell) and an upper body portion 64 (e.g. cushioned body).

The heated insole 300 further includes a heating assembly 220. As shown in FIG. 6, the heating assembly 220 includes the frame 12, a ribbon cable 312, and a heater panel 314. As discussed above, the insole layers (top layer 302 and heel cushion 306) include openings 308, 310 (respectively) that are shaped to receive the frame 12. The frame 12 includes a connector 46 that electrically couples to a connector of the battery 14, when the battery 14 is placed within the frame 12. The heater panel 314 may be any desirable shape. As shown, the heater panel 314 is a flat, substantially rectangular shape designed to fit within the forefoot portion of the insole. The ribbon cable 312 (or other conductive material) delivers electric current from the battery 14, when coupled to the connector 46, to the heater panel 314. Preferably and as shown, the ribbon cable 312 is coupled to a circuit 210. In a preferred embodiment, the ribbon cable 312 has a first end that is soldered or otherwise electrically connected to circuit board 210 and a second end that is connected to the heater panel 314. The circuit 210 is configured to adjust the level of energy transferred from the battery 14 to the heater panel 314. For example, the circuit 210 may be programmed to provide certain heating levels, e.g., low, medium, and high. In some embodiments, the circuit 210 may be operably associated with a temperature sensor, and the circuit 210 delivers energy to maintain a certain threshold temperature level (such as body temperature) in response to readings transmitted from the temperature sensor. In certain embodiments, the circuit 210 may be controlled by a remote control (not shown). In such an embodiment, the circuit 210 includes a receiver that receives signal from a remote, decodes the signal, and then the circuit 210 executes the operation based on the signal. In embodiments that include a battery indicator 27, the circuit 210 controls an LED of the battery indicator. For example, the circuit 210 may cause the LED to emit light as discussed in more detail above. In addition, the circuit 210 may cause the LED to emit light upon receipt of a signal from the remote control.

Remote control technology is generally known, and relies on sending a signal, such as light, Bluetooth (i.e. ultra-high frequency waves), and radiofrequency, to operate a device or circuit. Dominant remote control technologies rely on either infrared or radiofrequency transmissions. A radiofrequency remote transmits radio waves that correspond to the binary command for the button you're pushing. As applicable to the present insoles, the command may include high heat, low heat, medium heat, on, or off. A radio receiver on the controlled device (e.g. circuit 210 of heating assembly 220) receives the signal and decodes it. The receiver then transmits the decoded signal to the circuitry, and the circuitry executes the command. The above-described concepts for radiofrequency remote controls are applicable for light and Bluetooth remote controls.

According to certain aspects, all electrical and electronic components (i.e. connector 46, circuit 210, ribbon cable 312, and heater panel 314) are completely coated or sealed with water proofing sealants, coatings, and water tight encapsulating means coating to enable the circuit to function well when exposed to moisture and water.

According to certain embodiments, the heated insole 300 further includes insulation and water-proofing. For example, the ribbon cable 312 and heater panel 314 may be sandwiched between an insulation layer 316 below (also shown in FIG. 7) and a water-proofing layer 318 above (also shown in FIG. 8). Water proofing layer 318 may be made of any of various woven or non-woven materials, which allow heat to pass there through. Insulation layer 316 supports the heater panel 314, ribbon cable 312 and the circuit board 210—all of which are placed on the top face of insulation layer 316. The insulation layer 316 has a contact region 320 which abuts the frame 12. The ribbon cable 312, heater panel 314, insulation layer 316 and water proofing layer 318 are aligned with the circuit board 210. The circuit board 210 is attached to the frame 12 with a rivet that connects the circuit board 210 to the battery frame 12. See, for example, FIGS. 11-12. The rivet allows variation in the angle between the frame 12 and ribbon cable 312/circuit board 210/heater panel 314.

Figure 9A:
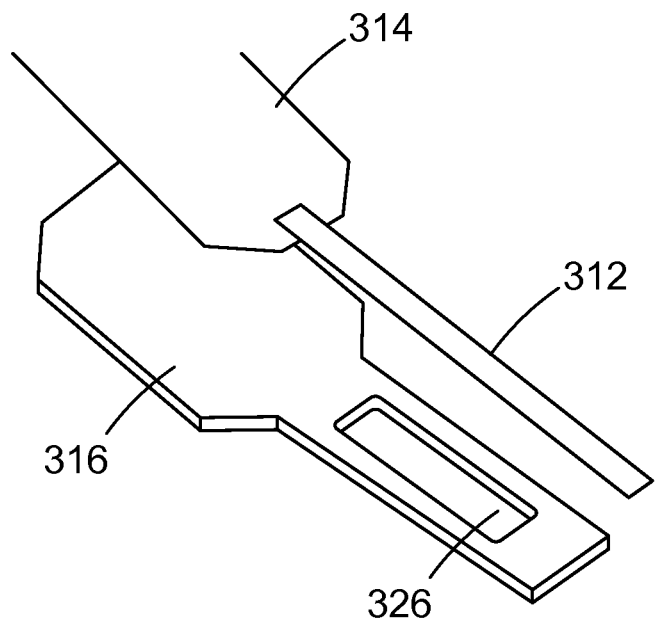
FIGS. 9A, 9B and 9C illustrate a configuration that allows bending of a heating assembly.
Figure 9B:
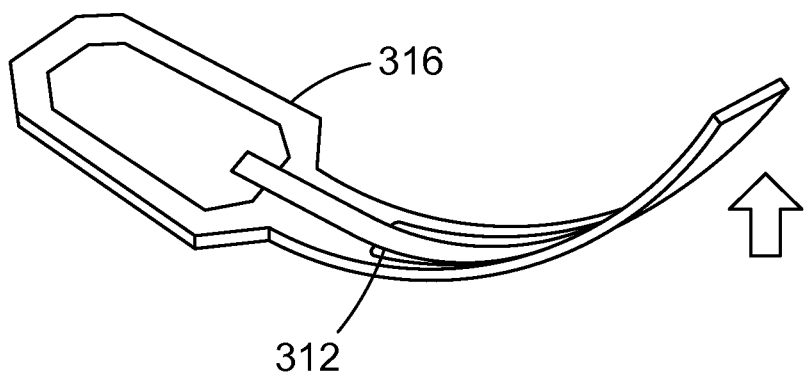
Figure 9C:
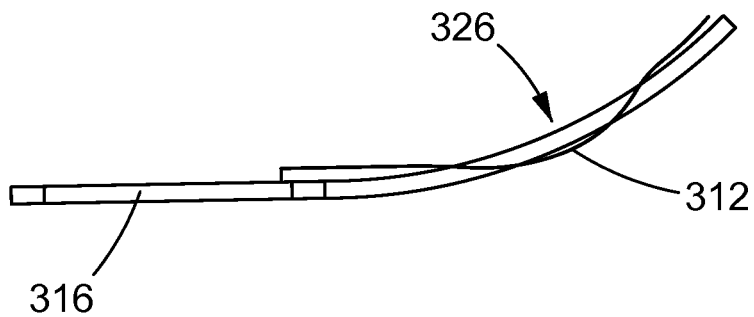

According to certain aspects, the design of the heating assembly 220 is flexible in order to allow the heating assembly 220 to withstand the stress and pressure accompanied by movement of a wearer. In some embodiments, the underlying insulation layer 316 includes an opening 326 that allows the ribbon cable 312 to release an amount of longitudinal stress by protruding excess length thereof into the opening 326. For example and as shown in FIG. 9A, the opening 326 is a substantially rectangular slot or groove that is slightly wider than ribbon cable 312. When the insole 300 is in its flat state, the ribbon cable 312 is laid flat in straight line between the heater 314 and the circuit board 210 without any excess length in the cable. When the insole 300 bends, the ribbon cable 312 and insulation 316 also bend (as shown in FIGS. 9B and 9C). Due to the ribbon cable's 312 fixed length, it needs room to move during bending or else buckling occurs. The slot 326 receives the excess ribbon cable 312, thereby eliminating stress on the ribbon cable's 312 electrical connections due to the bending of the insole 300. This helps to protect the ribbon cable 312 and its electrical connections from being torn or compromised by bending and sheering stresses. In certain embodiments, the heater panel 314 is attached to insulation layer 316 in a manner that allows slight movement of the heater panel 314 as the insole 300 bends. This relieves bending stress on the heater panel 314 caused by the bending of the insole 300. For example, in one embodiment, the heater panel 314 is glued, riveted or otherwise connected at one end thereof to the underlying insulation layer 316. The insulation layer 316 is preferably formed from a soft, pliable material, which allows some "give" when the heater panel 314 is pulled by ribbon cable 312 during bending.

Figure 7:
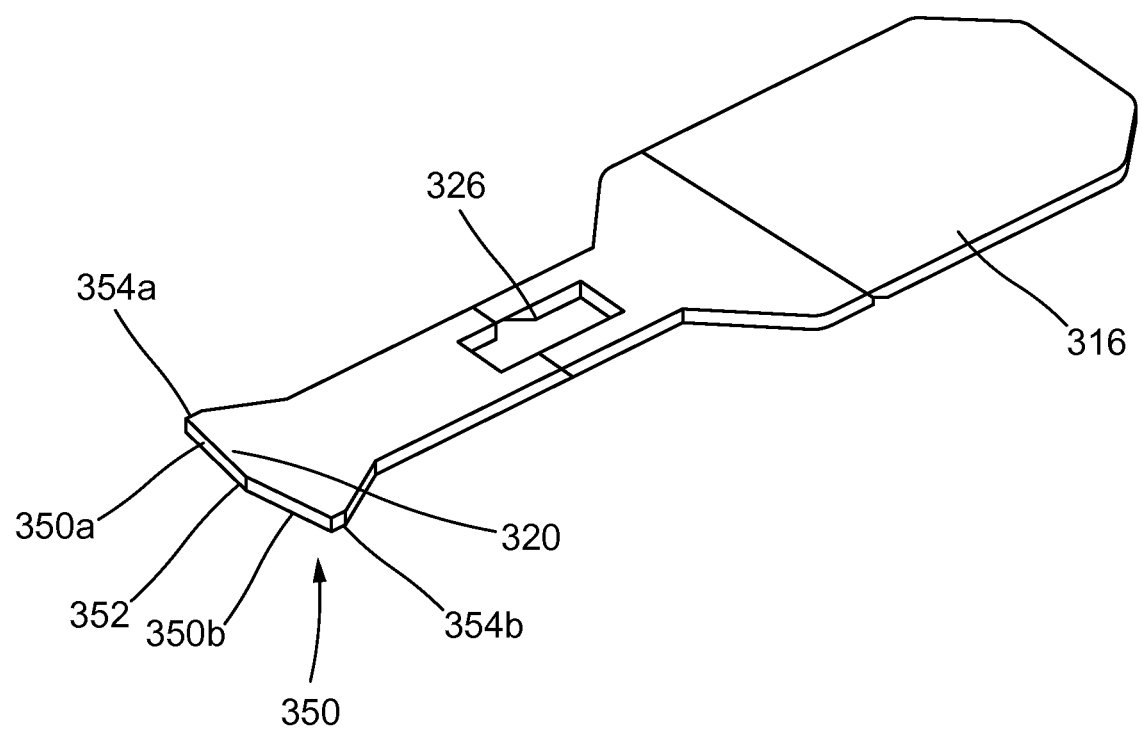
FIG. 7 illustrates an insulation layer of an insole of the invention.
Figure 8:
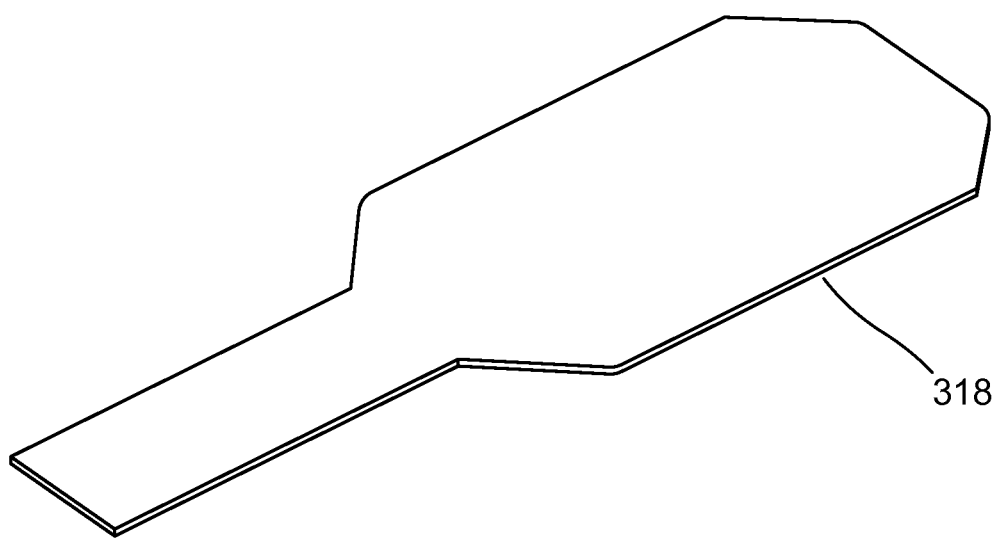
FIG. 8 illustrates a water-proofing layer of an insole of the invention.

Referring now to FIG. 7, the insulation portion 316 has a contact region 320 that abuts the frame 12. The contact region 320 is designed to be used interchangeably in right and left shoes. To that end, and as best shown in FIG. 7, the terminal end 350 of contact region 320 angles outwardly to create two different attachment ends. As shown, wall 350a emanates from a first corner 354a of the contact region 320 and angles outwardly. Wall 350b similarly emanates for a second corner 354b and angles outwardly. Walls 350a and 350b meet at apex 352. This geometry enables the insulation layer 316 and the heater 314 to be assembled in a range of angles so the same assembly would fit into left and right shoes with varying sizes. This geometry is described further in reference to FIG. 10.

Figure 10:
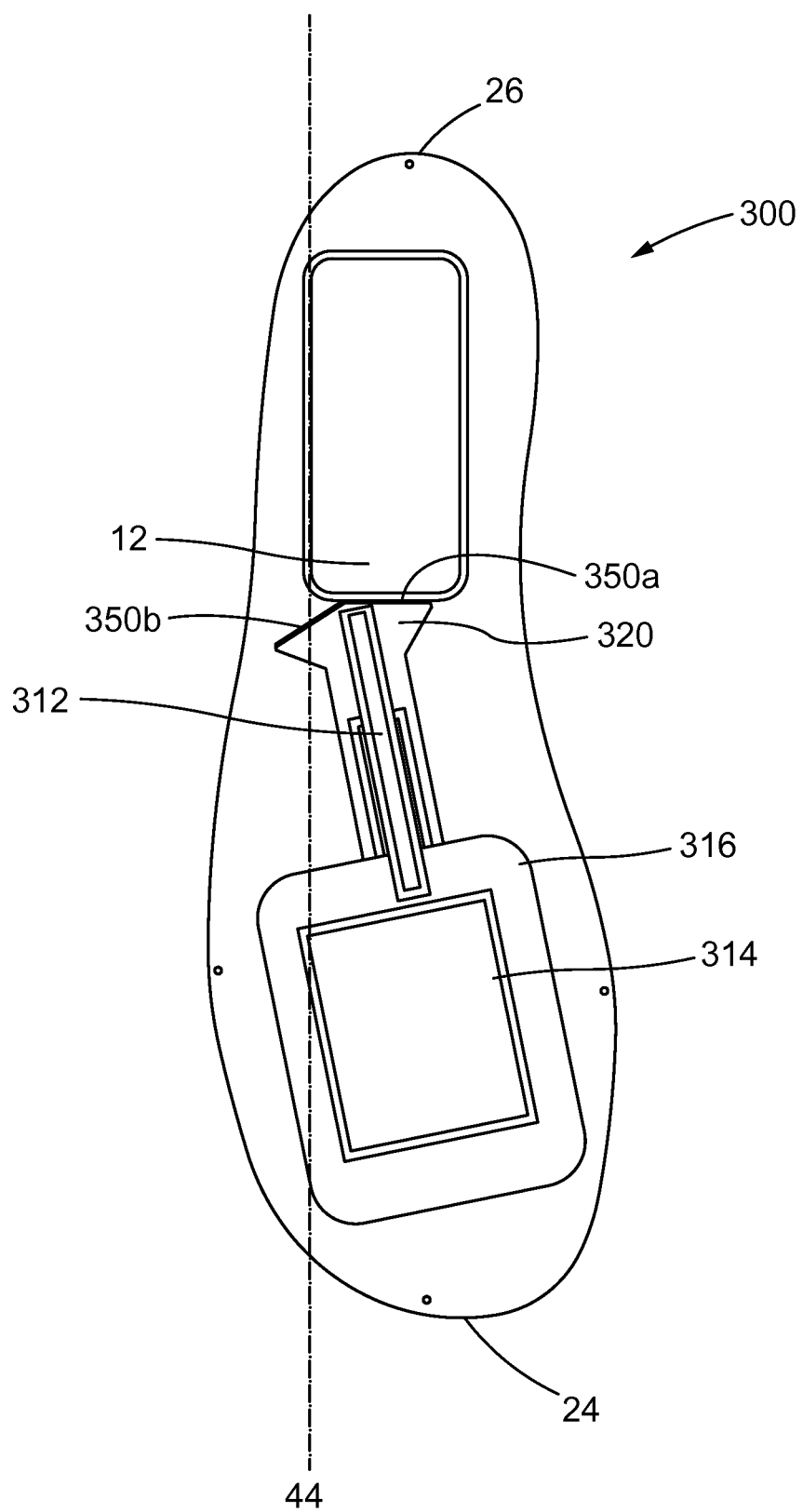
FIG. 10 illustrates a layout of a heating assembly of the invention according to certain embodiments.

FIG. 10 shows a bottom transparent view of an insole 300 according to an embodiment of the invention. As shown, an insole 300 is slightly angled from heel (proximal end 26) to toe (distal end 24). In order to substantially center the heater panel 314 in the forefoot portion 6 of the insole 300, the heater panel 314 must be somewhat offset with respect to the heel portion 2. As illustrated by the dotted line 44 in FIG. 10, if the ribbon cable 312 and heating element 314 would emanate from the frame 12 in a substantially linear manner—the heating element 314 would not be substantially centered in the forefoot portion 6, but rather it would be skewed to one side of the forefoot portion 6. However because, as shown, wall 350a abuts the frame 12 and because wall 350a is angled, the trajectory of the ribbon cable 312 and heating element 314 is slightly angled so as to position the heating element 314 in the general center of forefoot portion 6. As shown in FIG. 10, wall 350a is used as a contact surface in a left shoe. Wall 350b may be used as a contact surface of a right shoe. The angled terminal end 350 of the contact region 320, thus, allows the ribbon cable 312 and heating panel 314 to be used in any shoe.

The above-described features of the heating assembly 220 (e.g. flexibility and angled nature due to contact region) beneficially allow the heating assembly 220 to be incorporated in an insole or sole of a wide variety of shoes, including worker boots, tennis shoes, hiking boots, skiing shoes, snow shoes, etc. In addition, the above-described features allow one to use the same manufacturing process to produce heating assemblies for both right and left insoles.

Figure 11:
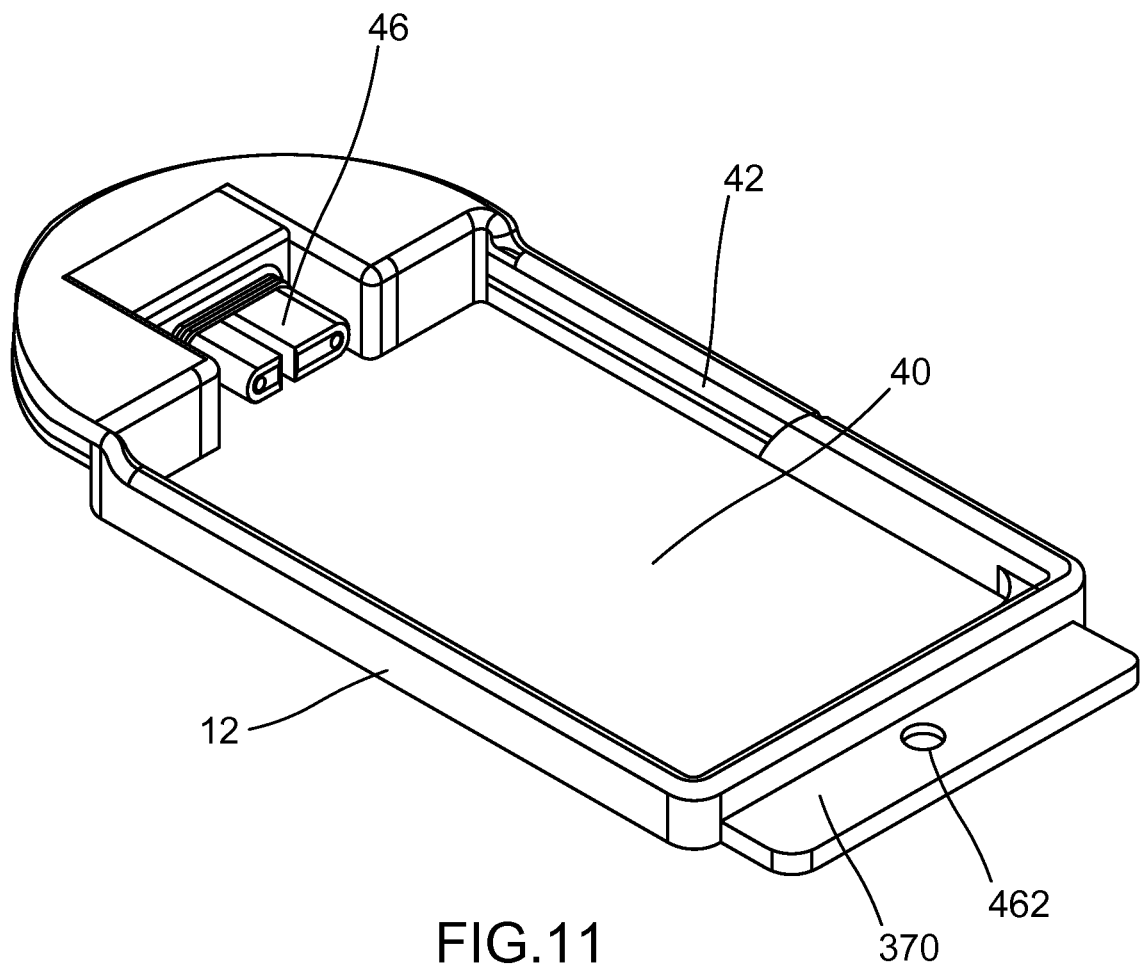
FIG. 11 illustrates a frame of a heating assembly according to certain embodiments.
Figure 12:
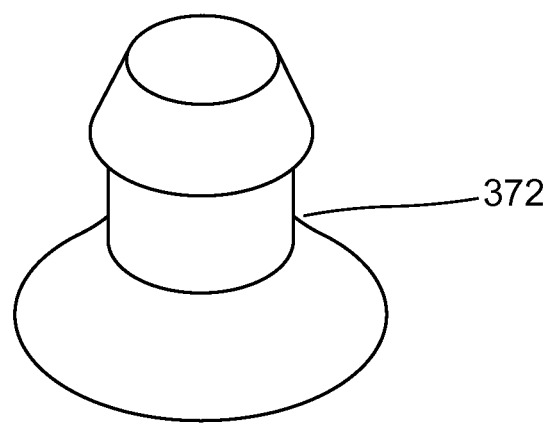
FIG. 12 depicts a rivet used to connect a circuit to the frame of FIG. 11.

FIG. 11 illustrates a close up view of the frame 12 that may be used in insoles of the invention. The frame 12 includes connector 46 and defines a recess 40 that is surrounding by sides 42. The recess 40 of the frame 14 is sized and shaped to receive the battery 14. The frame further includes extension member 370. The extension member 370 includes a rivet opening 462. A rivet associated with the circuit 210 (as shown in FIG. 6) may couple to the frame 12 via rivet opening 462. FIG. 12 illustrates a rivet 372 suitable for coupling the circuit 210 to the frame 12. Preferably, the rivet 372 is flexible such that it can deflect without breaking. A flexible rivet maintains the integrity of the connection between the frame 12 and the circuit board 210 despite bending of the insole 300. In certain embodiments, the rivet 372 is made from a technical grade elastomeric material.

Figure 18:
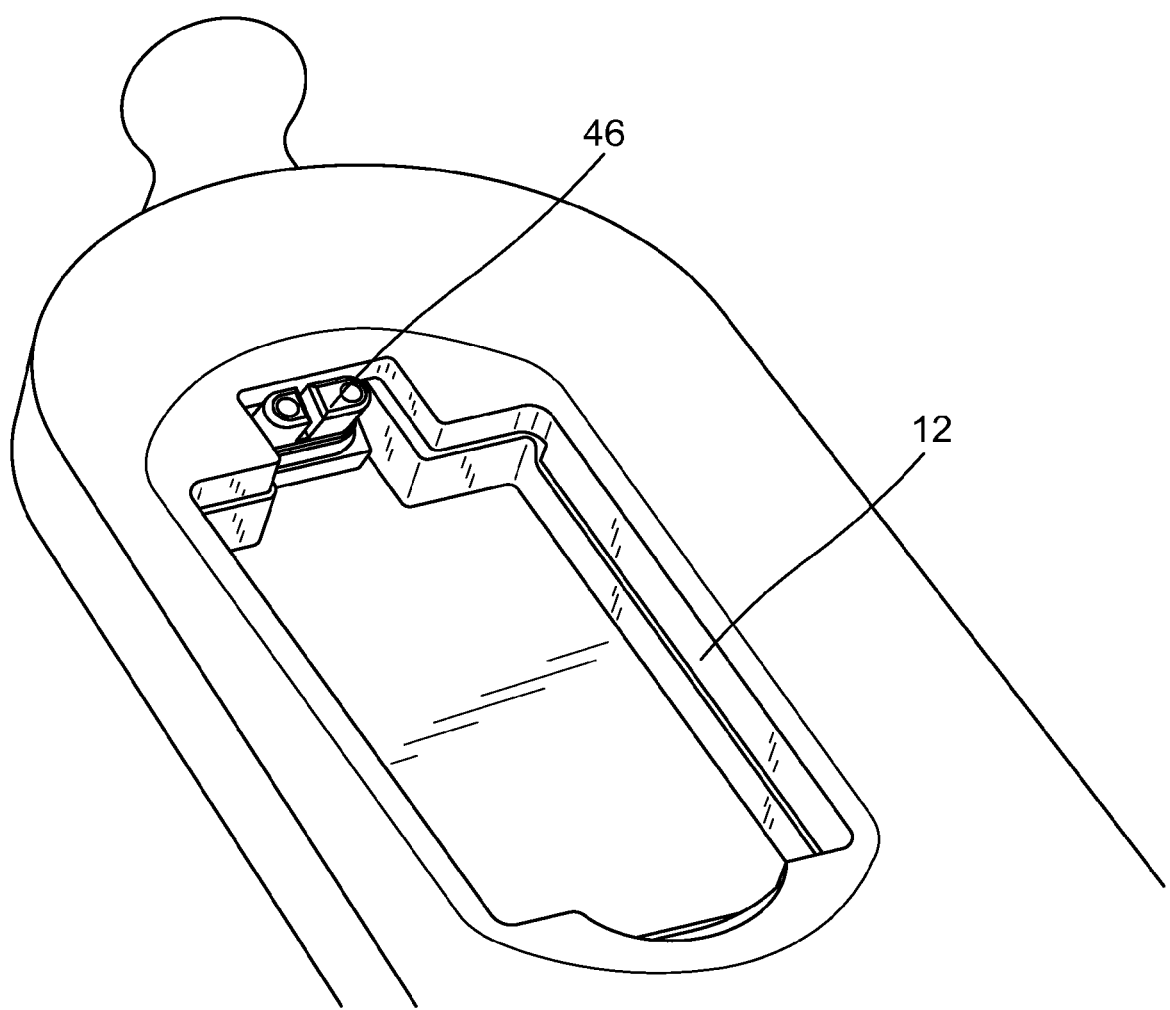
FIG. 18 illustrates enlarged prospective view of a heel portion of an insole of the invention, and shows a connector positioned at an incline.

As discussed above, the connector 46 of the frame 12 may, according to certain embodiments, pivot or rotate in order to connect to the battery as it is placed directly into the frame 12. This pivoting motion allows the battery 14 to snuggly fit within the recess of the frame 12. Without the pivoting motion, the frame 12 and its recess may have to be larger than the battery in order to accommodate the lateral motion required to connect the battery 14 to the connector 26. FIG. 18 illustrates an enlarged view of the heel portion of an insole with the connector 46 positioned at an incline. The angle of the incline can vary depending on applications and the amount of pivot one desires. In certain embodiments, the connector may be configured to rotate, for example, 10°, 20°, 30°, . . . , 80°, 90°.

Figure 13A:
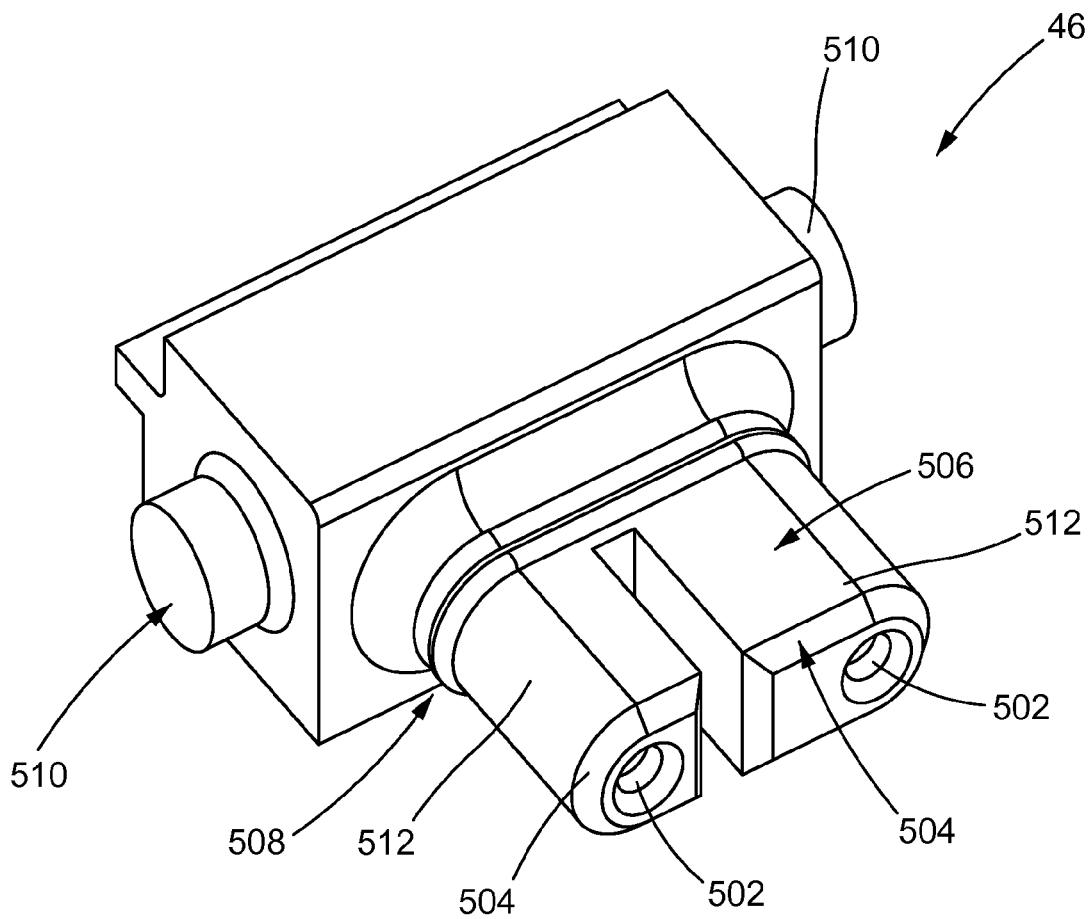
FIGS. 13A and 13B illustrate a connector of the invention.
Figure 13B:
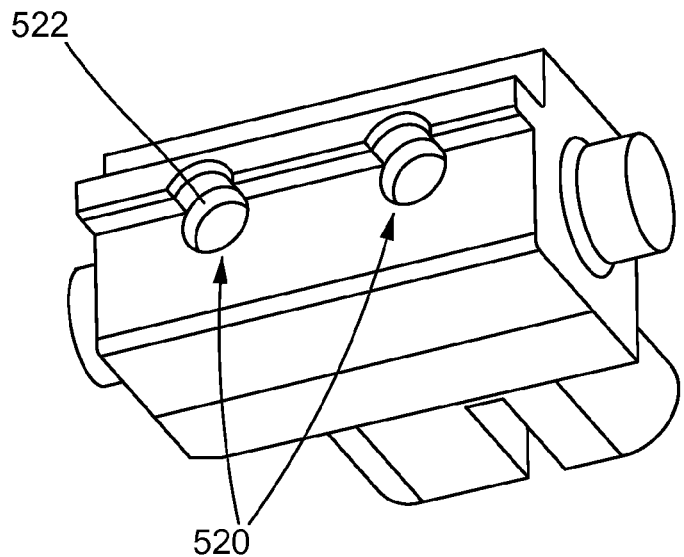

FIGS. 13A and 13B illustrate an exemplary design of the connector 46. The connector 46 includes one or more hinges 510. The hinges mate with indents in the frame 12 (not shown). The hinge 510 allows the connector 46 to pivot/rotate upwardly in order to align with a battery 14 to be inserted. The connector may be formed from a polymer, plastic, rubber, and/or thermoplastic elastomeric material. The connector 46 is preferably constructed out of elastomeric material giving it the ability to absorb deflection and stress. The above-mentioned features of the connector 46 allow the connector 46 to maintain its mechanical integrity even while deflecting and being subjected to external stresses (e.g. pressure from a wearer's movement).

Figure 16:
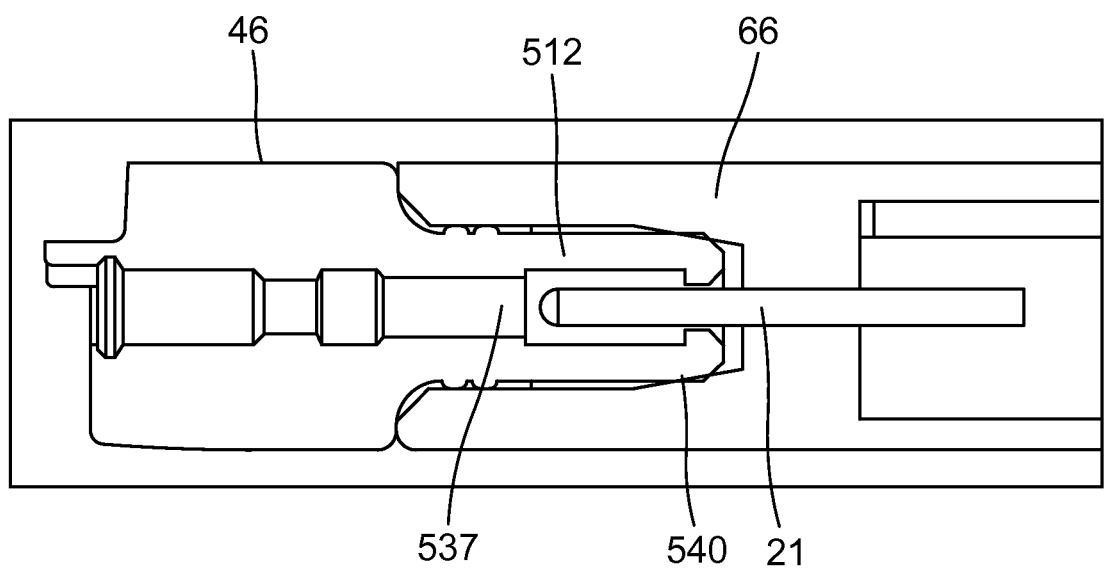
FIG. 16 illustrates the coupling between a battery and a connector of the frame.

According to certain embodiments and as shown in FIG. 13A, the connector 46 includes one or more electrical contact housing members 512. Electrical contacts (best shown in FIG. 16) are housed inside of the housing members 512, and are accessible through openings 502. The electrical contact housing members 512 mate fit with a connector portion 66 of the battery 14. In particular embodiments, the connector portion 66 of the battery 14 defines a recess 19 that includes an internal separator 17. See, for example, FIG. 3C. When the battery 14 is coupled to the connector 46, the internal separator 17 is positioned between the electrical contact housing members 512. Thus, the internal separator 17 acts to guide the housing members 512 into place as the battery 14 coupled to the connector 46. Electrical contacts (as shown in FIG. 16) within the housing members 512 are then coupled to battery pins 21 that are positioned in the battery recess 19. When the contact points are coupled to the battery pins 21, energy from the battery 14 can be transferred to the heater panel 314 via the connector 46.

As further shown in FIG. 13A, the outer walls of the connector 46, which face the battery, may have angled geometry 504 to help guide the electrical contact housing members 512 into the battery recess 19. In certain embodiments, the connector 46 further includes one or more ridges 508 for water proofing. When the battery 14 is fully engaged with the connector 46, the ridges 508 prevent water from entering the battery recess 19 and disrupting the electrical connection.

Figure 15:
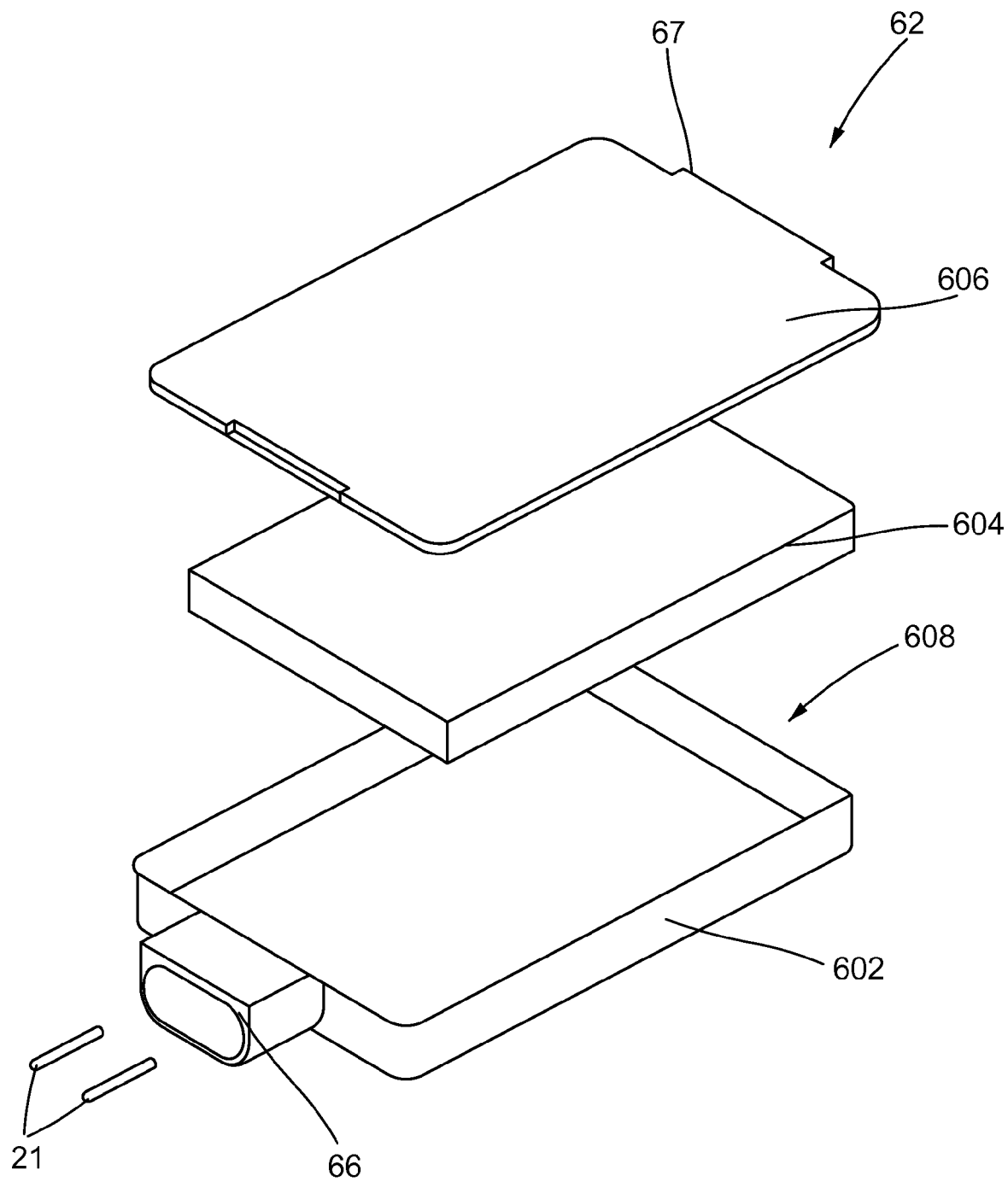
FIG. 15 illustrates an exploded view of a battery of the invention.

FIG. 13B illustrates a back side of the connector 46, which is in communication with the heating assembly 220. The back side of the connector 46 may include one or more openings 520 or similar cutouts for allowing wires or similar conductors to pass out of the connector 46. Those conductors/wires are in electrical communication with the electrical contacts 537 (as shown in FIGS. 15 and 16) of the connector 46 and may be coupled to the circuit 210, ribbon cable 312, or both. The openings 520 are sealed with a water proof sealant to protect the wires from water or other elements. The back side of the connector 46 may also include a lip 522, which is used as a height gauge for the wires and sealant compound during the assembly of the connector 46. Lip 522 presents a physical barrier which limits the amount of sealant compound that may be introduced into the area there below. This prevents excessive build-up of sealant materials—which may prevent or limit movement of the connector 46.

Figure 14:
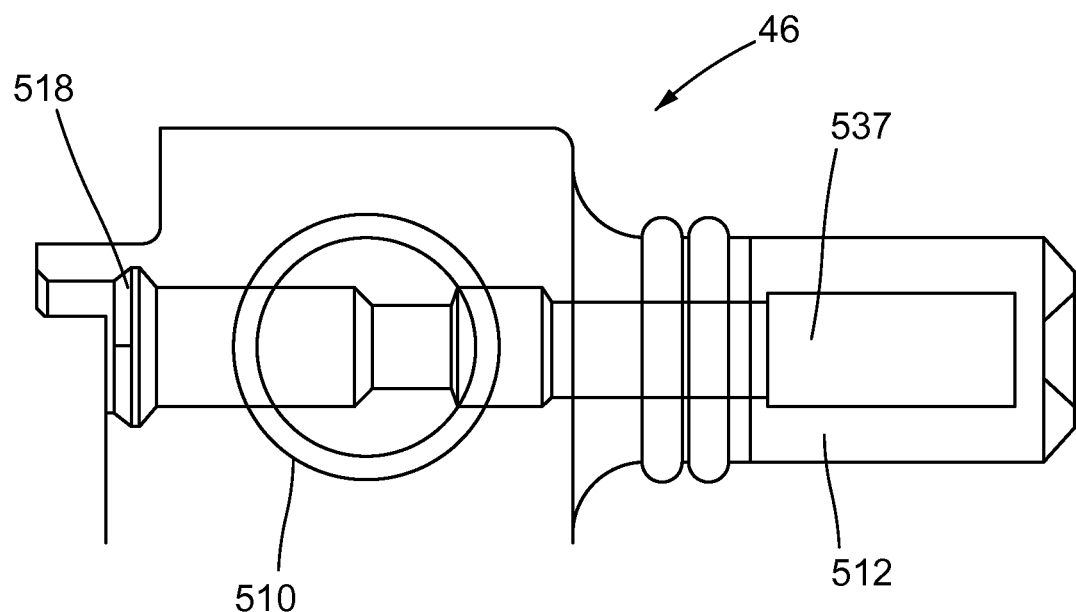
FIG. 14 illustrates a transparent side view of the connector of FIGS. 13A and 13B.

FIG. 14 shows a side, transparent view of a connector 46. As shown, a structural recessed round cavity 518 inside of the connector 46 is filled with the sealant and keeps the sealant in place to help maintain any sealant that is introduced through openings 520 from loosening and compromising the water tight seal.

As discussed above, the insoles of the invention are designed to receive a battery 14. See, for example, FIGS. 3A-3C. In certain embodiments, the battery 14 may be a battery pack. A battery pack includes a body enclosing a battery cell. The body may be the lower body portion 62, as shown in FIGS. 3A-3C. FIG. 15 illustrates an exploded view of the lower body portion 62. As shown in FIG. 15, the lower body portion 62 of the battery pack includes a boxed portion 602. The boxed portion 602 defines a recess to receive the battery cell 604 and includes the connector portion 66 (which couples to the connector 46 of the frame 12). A battery cell 604 may be placed in the recess. The boxed portion 602 may include a locking ridge 608 or tab on the side opposite of the connector portion 66. Optionally, the locking ridge 608 meets with an indent in the frame 12, when the battery 14 is placed in the frame, in order to prevent undesirable movement of the battery 14 while still allowing the battery 14 to be removed from the frame upon application of upward force (e.g., manual removal). The battery cell 604 is enclosed in the boxed portion 602 via lid 606. The lid 606 may be permanently attached to the battery box 602 or the lid 606 may be removable to allow one to swap the battery cell 604. The lid 606 includes a finger tab 67 that one can leverage with his/her finger to assist in removing the battery 14 from the frame 12. When the lid 606 is removable, the finger tab 67 may also be used to remove the lid 606 from the boxed portion 602. When assembled, the pins 21 of the connector portion 66 are in electrical communication with the battery cell 604.

FIG. 16 provides a transparent view of the battery 14 coupled to the connector 46 of the frame, according to certain embodiments. As shown in FIG. 16, the pins 21 of the battery 14 enter the electrical contact housing members 512 of the connector 46, which places the pins 21 in electrical communication with the electrical contacts 537. Ideally and as shown, the inners walls of the recess 19 of the connector portion 66 include one or more slanted segments 540. The slanted segments press on the edges of the connector 46 when the battery is inserted all the way into the connector, this pressure forces the electrical contacts 537 to press against the pins 21, and maintain such contact.

Figure 17:
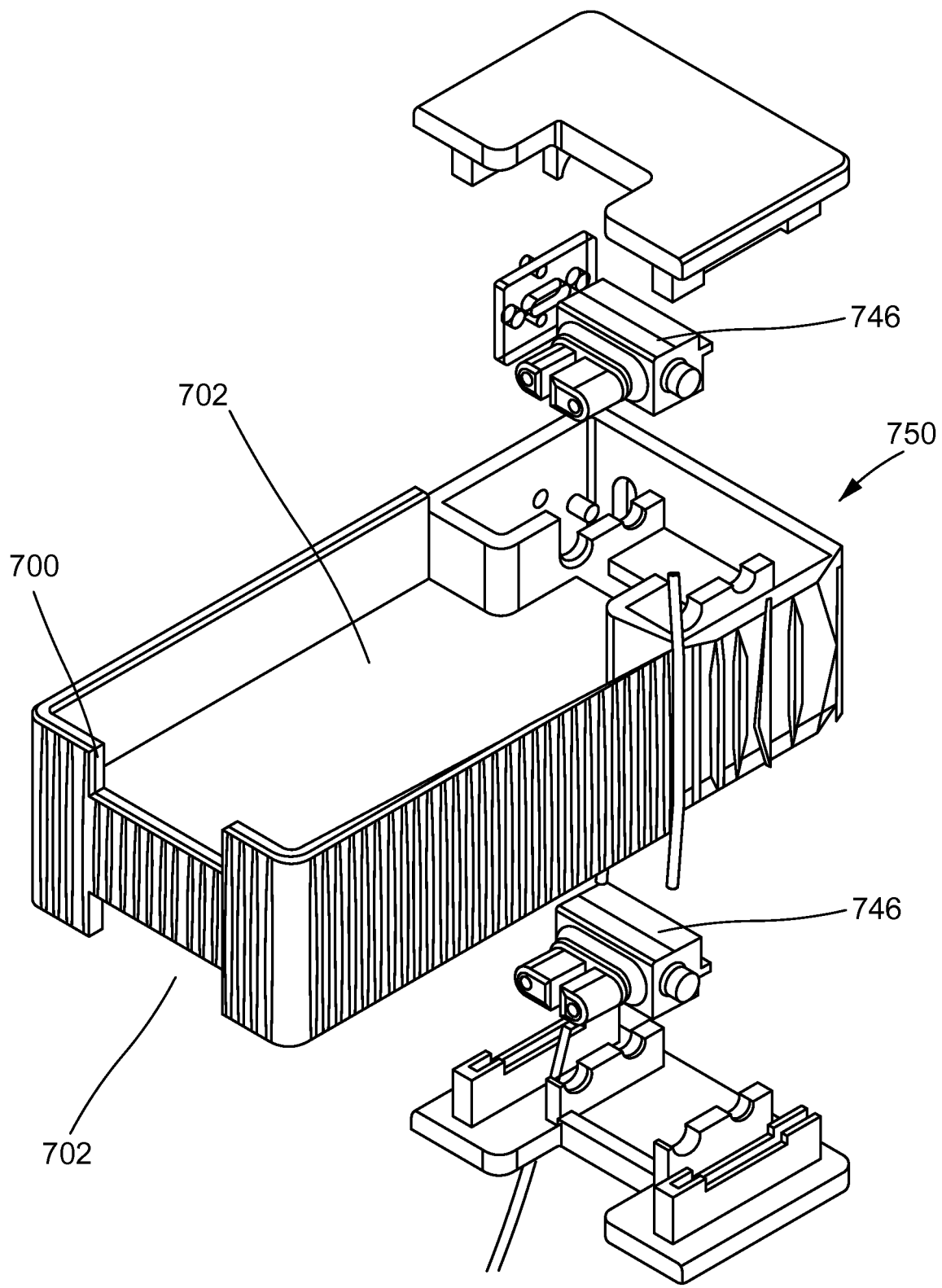
FIG. 17 illustrates a battery magazine of the invention.

FIG. 17 shows a battery magazine for charging and transporting batteries, according to certain embodiments. As shown in FIG. 17, the battery magazine is a frame 700 forming one or more recesses 702, each configured to receive a battery. The frame 700 of the magazine is configured to hold one or more connectors 746 (which are ideally the same as pivoting connector 46 of frame 12). The connectors 746 may be coupled to electrical cord that allows the connectors 746 to charge one or more batteries when the electrical wiring is plugged into an electrical outlet. In alternative embodiments, the battery magazine may include a USB socket that is coupled to the connectors 746. In such embodiments, a USB adaptor may be used to charge the batteries. The battery magazine may also include a circuit, such as a printed circuit board, disposed within the magazine and operably associated with the connectors 746. A function of the circuit includes monitoring charging of the battery to prevent under- or overcharging of the batteries. The circuit may be operably associated with one or more LEDs. In one embodiment, the battery magazine includes LEDs for each battery that the magazine is designed to receive. In this embodiment, the circuit can be configured to cause each LED to emit light in order to convey one or more functions with respect to one or more batteries in the magazine. The one or more functions may include, for example, showing the following: battery is connected, battery is charging, battery is malfunctioning, and battery is fully charged. The light emitted from the LED may be same or different for each function. For example, the light may be a different color for the one or more functions, or the light may be emitted in the same or different manner (single pulse, series of pulses, or constant light) for the one or more functions.

Portions of the insole (such as the frame) and the battery (such as the lower body portion) may be formed from any suitable plastic, polymer, or polymeric blend. Suitable materials may include Polyethylene terephthalate (PET), Polyethylene (PE), High-density polyethylene (HDPE), Polyvinyl chloride (PVC), Polyvinylidene chloride (PVDC), Low-density polyethylene (LDPE), Polypropylene (PP), Polystyrene (PS), High impact polystyrene (HIPS), etc. The material of the frame and the battery may be the same or different. In addition, the material of the insole body and the layers of the insole may depend on the need of the insole (e.g. what activity will the insole be used for). These insole materials may be plastic, polymer, rubber, thermoplastic elastomeric material, leather, cotton, and polymer foams. Preferred polymer foams include polyurethane foams.

The invention may be embodied in other specific forms without departing from the spirit or essential characteristics thereof. The foregoing embodiments are therefore to be considered in all respects illustrative rather than limiting on the invention.

The invention claimed is:

1. An insole for a shoe, the insole comprising
   an insole body including a battery-receiving portion; and
   a battery configured to be removable from and insertable into the battery-receiving portion while the insole is disposed within the shoe, the battery forms a portion of a top surface of the insole body when the battery is inserted into the battery-receiving portion,
   wherein the insole body further comprises a frame that receives the battery and the frame is operably associated with a connector that pivots to connect and disconnect from the battery.

2. The insole of claim 1, wherein the battery is rechargeable.

3. The insole of claim 1, wherein the insole body comprises a heating assembly.

4. The insole of claim 3, wherein the battery, when disposed within the insole body, is operably associated with the heating assembly.

5. The insole of claim 4, wherein the heating assembly comprises:
   a frame that receives the battery and is disposed within the insole body;
   a heating member; and
   a connector associated with the frame, the connector configured to transmit energy from the battery to the heating member.

6. The insole of claim 5, wherein the heating assembly further comprises a circuit coupled to the connector, the circuit configured to adjust a level of the energy transmitted from the battery to the heating member.

7. The insole of claim 6, wherein the circuit is adjustable from a remote control.

8. The insole of claim 5, wherein the heating member delivers heat to at least a forefoot portion of the insole body.

9. The insole of claim 8, wherein the heating member comprises a conductive ribbon and a heater panel.

10. The insole of claim 1, wherein a surface of the battery, when the battery is disposed within the frame, is substantially flush with a surface of the insole.

11. The insole of claim 1, wherein the battery comprises a battery pack that encloses a battery cell.

12. An insole for a shoe, comprising
an insole body comprising a frame that is configured to receive a battery; and
a battery that, when disposed within the frame, forms a portion of a top surface of the insole body and is directly removable from the insole body,
wherein the frame comprises a connector that pivots to connect and disconnect from the battery.

13. The insole of claim 12, wherein the battery is rechargeable.

14. The insole of claim 12, wherein the battery, when disposed within the frame, is operably coupled with a heating member.

15. The insole of claim 14, wherein the connector is configured to transmit energy from the battery to the heating member.

16. The insole of claim 15, wherein the connector is coupled to a circuit that is disposed within the insole body and configured to adjust a level of energy transmitted from the battery to the heating member.

17. The insole of claim 16, wherein the circuit is adjustable from a remote control.

18. The insole of claim 14, wherein the heating member is disposed within the insole body.

19. The insole of claim 14, wherein the heating member delivers heat to at least the portion of the insole body corresponding to the forefoot of a wearer.

20. The insole of claim 19, wherein the heating member comprises a conductive ribbon and a heater panel.

21. The insole of claim 12, wherein the battery comprises a battery pack that encloses a battery cell.

22. A heated insole for a shoe, said heated insole configured to be inserted into and removed from within a shoe, said heated insole comprising:
an insole body comprising a frame and a connector;
a heating member disposed within the insole body and operably associated with the connector; and
a battery configured to fit within the frame and couple to the heating member via the connector, the battery forming a portion of a top surface of the insole body when disposed within the frame such that the battery may be removed directly from the surface of the insole body while the insole is disposed within a shoe, wherein the connector pivots to connect and disconnect from the battery.

23. The insole of claim 22, wherein the battery is rechargeable.

24. The insole of claim 22, wherein the connector is configured to transmit energy from the battery to the heating member.

25. The insole of claim 24, wherein the connector is coupled to a circuit that is disposed within the insole body and configured to adjust a level of energy transmitted from the battery to the heating member.

26. The insole of claim 25, wherein the circuit is adjustable from a remote control.

27. The insole of claim 22, wherein the heating member delivers heat to at least the portion of the insole body corresponding to the forefoot of a wearer.

28. The insole of claim 27, wherein the heating member comprises a conductive ribbon and a heater panel.

* * * * *